(12) United States Patent
Trujillo

(10) Patent No.: US 10,660,432 B2
(45) Date of Patent: May 26, 2020

(54) SHELF SYSTEM

(71) Applicant: John I Trujillo, Sacramento, CA (US)

(72) Inventor: John I Trujillo, Sacramento, CA (US)

( * ) Notice: Subject to any disclaimer, the term of this patent is extended or adjusted under 35 U.S.C. 154(b) by 48 days.

(21) Appl. No.: 16/101,471

(22) Filed: Aug. 12, 2018

(65) Prior Publication Data
US 2018/0360206 A1  Dec. 20, 2018

Related U.S. Application Data

(63) Continuation-in-part of application No. 15/151,842, filed on May 11, 2016, now Pat. No. 10,123,614.
(Continued)

(51) Int. Cl.
*A47B 5/02* (2006.01)
*F16B 1/00* (2006.01)
(Continued)

(52) U.S. Cl.
CPC .................. *A47B 5/02* (2013.01); *A47B 5/04* (2013.01); *A47K 1/09* (2013.01); *A47K 10/22* (2013.01); *A47K 10/3836* (2013.01); *A47K 10/40* (2013.01); *F16B 1/00* (2013.01); *F16B 5/002* (2013.01); *F16B 5/0088* (2013.01);
(Continued)

(58) Field of Classification Search
CPC . A47B 46/00; A47B 96/027; A47B 2021/066; A47B 3/00; A47B 13/081; A47B 5/006; A47B 1/00; A47B 2021/068; A47B 5/04; A47B 19/08; A47B 1/05; A47B 3/083; A47B 77/10; A47B 7/02; A47B 5/02; A47B 3/002; A47B 5/00; A47B 13/16; A47B 2003/0835; A47B 83/045; A47B 96/025; A47K 10/18; A47K 2201/02; A47K 2010/389; A47K 10/40; A47K 2010/3233; A47K 1/09; A47K 10/38; A47K 10/3836; A47K 10/22; A47K 2201/00; B64D 11/0638; B64D 11/0605; A47C 9/06; A47C 7/70; F16B 2001/0035;
(Continued)

(56) References Cited

U.S. PATENT DOCUMENTS 1,642,125 A * 9/1927 Nelson .................... A47C 9/06
  297/14
1,902,319 A * 3/1933 Bloedel .................. A47B 67/02
  312/235.4
(Continued)

*Primary Examiner* — Hiwot E Tefera
(74) *Attorney, Agent, or Firm* — Francos S. De Ligouri; DP IP Group

(57) ABSTRACT

A shelf system has a shelf component and a support frame component configured to removably support the shelf component in a cantilever fashion in an assembled state of the shelf system. The shelf component has a top surface, a bottom surface, a front end, a rear end, opposite sides between the front and rear ends, and a longitudinal groove formed in the bottom surface between the opposite sides. The support frame component is formed of a base panel having a front side, a rear side, a top end, a bottom end and opposite lateral sides between the top and bottom ends. A pair of support members extend from the front side of the support frame component for supporting a cross member. The longitudinal groove of the shelf component is configured to engage the cross member of the support frame component in the assembled state of the shelf system.

21 Claims, 20 Drawing Sheets

Related U.S. Application Data

(60) Provisional application No. 62/261,997, filed on Dec. 2, 2015.

(51) Int. Cl.

| | | |
|---|---|---|
| *F16B 5/00* | (2006.01) | |
| *A47K 10/22* | (2006.01) | |
| *A47B 5/04* | (2006.01) | |
| *A47K 1/09* | (2006.01) | |
| *A47K 10/40* | (2006.01) | |
| *A47K 10/38* | (2006.01) | |
| *F16B 5/06* | (2006.01) | |

(52) U.S. Cl.
CPC ...... *F16B 5/0614* (2013.01); *A47K 2010/389* (2013.01); *A47K 2201/00* (2013.01); *F16B 2001/0028* (2013.01); *F16B 2001/0035* (2013.01)

(58) Field of Classification Search
CPC ...... F16B 5/0614; F16B 5/0088; F16B 5/002; F16B 2001/0028

USPC ........ 108/33, 65, 69, 34, 35, 37, 38, 39, 40, 108/41, 42; 297/145; 211/87.01, 88.01, 211/88.02, 90.01, 119.003; 312/240–242, 312/306, 312, 246

See application file for complete search history.

(56) References Cited

U.S. PATENT DOCUMENTS

| | | | | |
|---|---|---|---|---|
| 2,249,403 | A * | 7/1941 | Stollsteimer | A47B 5/04 248/240.3 |
| 4,600,241 | A * | 7/1986 | Fujii | A47C 9/06 297/452.19 |
| 5,050,929 | A * | 9/1991 | Gueringer | A47C 7/70 297/145 |
| 5,248,067 | A * | 9/1993 | Garcia | A47K 5/00 222/181.2 |
| 5,417,397 | A * | 5/1995 | Harnett | A47K 5/05 248/206.5 |
| 5,638,966 | A * | 6/1997 | Kuntz | A47K 10/40 211/153 |
| 6,155,438 | A * | 12/2000 | Close | A47F 1/125 211/119.003 |
| 6,796,249 | B1 * | 9/2004 | Hiras | A47B 96/02 108/157.13 |
| 8,434,415 | B1 * | 5/2013 | Federici | A47C 7/62 108/38 |
| 2008/0229630 | A1 * | 9/2008 | Mullenbach | D06F 81/06 38/104 |
| 2009/0026342 | A1 * | 1/2009 | Bochner | A47B 5/04 248/460 |
| 2011/0265310 | A1 * | 11/2011 | Beaulieu | A47B 97/00 29/525.08 |
| 2012/0153791 | A1 * | 6/2012 | Green | E05B 65/46 312/333 |
| 2014/0321105 | A1 * | 10/2014 | Meyer | A47F 5/0068 362/125 |
| 2016/0128466 | A1 * | 5/2016 | Daneshrad | A47B 19/08 248/558 |
| 2016/0153200 | A1 * | 6/2016 | Pervan | E04F 15/102 52/582.2 |
| 2017/0000296 | A1 * | 1/2017 | Wang | A47K 1/09 |
| 2019/0053623 | A1 * | 2/2019 | Sisto | A47B 96/06 |

* cited by examiner

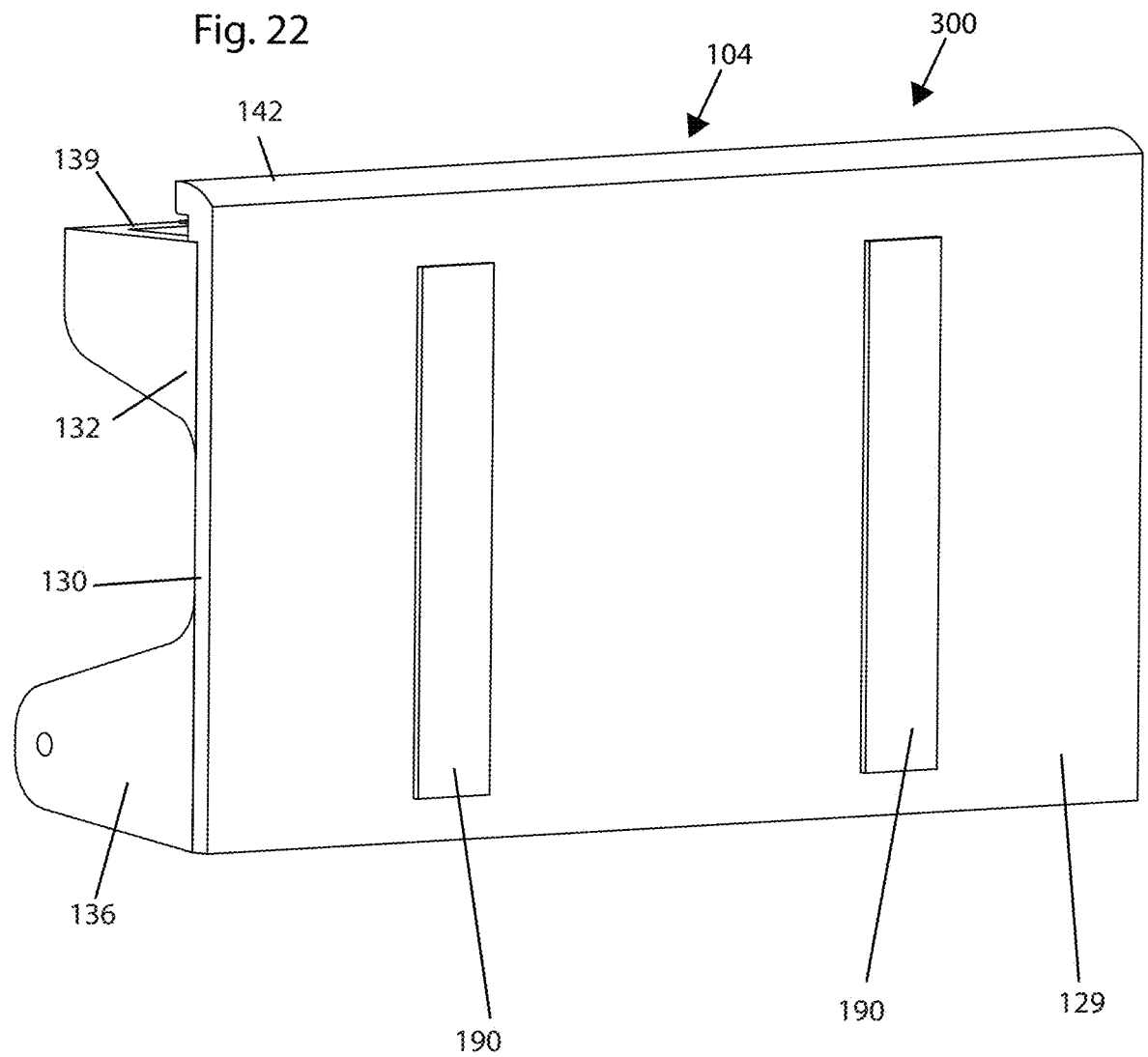

SHELF SYSTEM

CROSS-REFERENCE TO RELATED APPLICATIONS

The present application is a continuation-in-part of and claims priority to U.S. patent application Ser. No. 15/151,842, filed on May 11, 2016, entitled "Concealed Shelf", which claims priority to U.S. Provisional Patent Application No. 62/261,997 filed on Dec. 2, 2015, entitled "Concealed Shelf System," the entire disclosures of which are incorporated by reference herein.

BACKGROUND

Field of the Disclosure

The present disclosure relates to the field of fixtures, and more particularly to shelf systems providing space-saving and folding and/or removable shelves and surfaces.

Background Information

As the population continues to increase, increasing the efficient use of space is required. Family sizes may become larger and while the size of a standard home may decrease. Specifically, the decrease in home size includes a decrease in available space for fixtures, furniture, and surfaces to place objects on. For example, a bathroom is generally a smaller room is a home and to save on space, pedestal sinks are installed without any surface area to place cosmetics and toiletries.

Often, people will try to place objects on the rim of a sink, which will result in the object falling into the sink or onto the floor. Perfumes, colognes, and other cosmetics or toiletries are made of glass or fragile containers that will be damaged from the fall. Electronics placed on the edge of a sink may also be damaged from impacting the floor, or from falling into a sink with water. This presents a danger to the user as electrical contact with water can be extremely dangerous and result in electrocution of the user. When toiletries such as toothbrushes make contact with the floor, there is an increased risk of contacting bacteria and other microorganisms that may be harmful to the user.

Currently, there are very few options that allow for increased surface area without sacrificing a large amount of space. A vanity or cabinet may have a sink installed on the countertop, but this defeats the purpose of trying to save space. Medicine cabinets may be used to store toiletries and cosmetics, but they are limited in size and prevent the accessibility offered by a counter top surface. People may install shelves extending outwardly from the wall, near the sink. However, this is a permanent fixture that may not take up floor space, but it does intrude into the functional space of the room.

Based on the foregoing, there is a need in the art for cost effective, efficient, space-saving, device that can be engaged when necessary, then put away when not in use. A device that will allow people the freedom of increased surface area for their items without the potential for danger or damage.

SUMMARY OF THE DISCLOSURE

In one aspect, the present disclosure is directed to a shelf system comprising a housing having a hollow interior, wherein the housing attaches to a surface; and a tray in communication with the housing, wherein in a first position the tray is concealed within the housing, and wherein in a second position the tray is retracted from the housing.

In an embodiment, the one or more apertures extend through the tray.

In an embodiment, the shelf has one or more tracks in communication with an interior surface of the housing and the tray, wherein the one or more tracks facilitate operation of the tray.

In an embodiment, the one or more electrical outlets are attached to the housing.

In an embodiment, the shelf has at least one holder attached to the shelf.

In an embodiment, the at least one holder is attached to a front side of the housing.

In an embodiment, the at least one holder is attached to a bottom surface of the tray.

In an embodiment, the tray has one or more extension segments.

In an embodiment, the one or more extension segments are telescopic relative to one another.

In an embodiment, the one or more extension segments are hingedly attached to one another.

In another aspect, the shelf system according to the present disclosure comprises a housing having a hollow interior, wherein the housing attaches to a surface; a tray in communication with the housing, wherein in a first position the tray is concealed within the housing, and wherein in a second position the tray is retracted from the housing; a holder attached to the shelf; and one or more electrical outlets electrically connected to a power source.

In an embodiment, the one or more electrical outlets are attached to the housing.

In an embodiment, the plurality of surfaces are telescopic relative to each other.

In an embodiment, the holder comprises a bar that receives a roll of paper.

In an embodiment, the tray comprises one or more extension segments.

In an embodiment, the one or more extension segments are telescopic relative to one another.

In an embodiment, the one or more extension segments are hingedly attached to one another.

In yet another aspect, the shelf system according to the present disclosure comprises a shelf component and a support frame component configured to removably support the shelf component in a cantilever fashion in an assembled state of the shelf system. The shelf component has a top surface, a bottom surface, a front end, a rear end, opposite sides between the front and rear ends, and a longitudinal groove formed in the bottom surface between the opposite sides. The support frame is formed of a base panel having a front side, a rear side, a top end, a bottom end and opposite lateral sides between the top and bottom ends. a pair of support members extending from the front side proximate the respective lateral sides and a cross member supported by the pair of support members. The shelf system is configured such that the shelf component is releasably secured to the support frame component in the assembled state of shelf system.

In one embodiment, for releasably securing the shelf component to the support frame component in the assembled state of shelf system, a first metal strip is mounted in the groove of the shelf component, a second metal strip is mounted on the top surface of the shelf component proximate the front end thereof, a first magnetic element is disposed on a the cross member for magnetic engagement with the first metal strip in the assembled state of shelf system, and a second magnetic element disposed at the top end of the base panel for magnetic engagement with the second metal strip in the assembled state of shelf system.

In another embodiment, a third magnetic element is disposed on the front side of the base panel for magnetic engagement with the first metal strip in a stored state of the shelf system in which the shelf system is not in the assembled state.

In another embodiment, for releasably securing the shelf component to the support frame component in the assembled state of shelf system, a number of pins extend from the groove of the shelf component, a number of holes are formed in the cross member for releasably receiving the respective pins, a metal strip is mounted on the top surface of the shelf component proximate the front end thereof, and a magnetic element is disposed at the top end of the base panel for magnetic engagement with the metal strip.

In another embodiment, for releasably securing the shelf component to the support frame component in the assembled state of shelf system, a number of pins extend from the cross member of the support frame components, a number of holes are formed in the groove of the shelf component for releasably receiving the respective pins, a metal strip is mounted on the top surface of the shelf component proximate the front end thereof, and a magnetic element is disposed at the top end of the base panel for magnetic engagement with the metal strip.

In yet another embodiment, the shelf component and the support frame component are made of one of a polyurethane plastic or acrylonitrile butadiene styrene (ABS) plastic.

In still another embodiment, the base panel of the support frame component has a preselected number of mounting holes configured to receive respective fasteners for releasably mounting the support frame component to a surface of a fixed structure.

In a further embodiment, the shelf system further comprising an adjustable stabilizing element mounted to the rear side of the base panel for adjustably stabilizing the shelf system in the assembled and stored states thereof while the frame component is releasably mounted to the fixed structure.

The foregoing, and other features and advantages of the disclosure, will be apparent from the following, more particular description of the preferred embodiments of the disclosure, the accompanying drawings, and the claims.

BRIEF DESCRIPTION OF THE DRAWINGS

For a more complete understanding of the present disclosure, the objects and advantages thereof, reference is now made to the ensuing descriptions taken in connection with the accompanying drawings briefly described as follows.

FIG. 22 is a perspective view of a shelf system according to another embodiment of the present disclosure.

DETAILED DESCRIPTION OF THE DISCLOSURE

Figure 1:
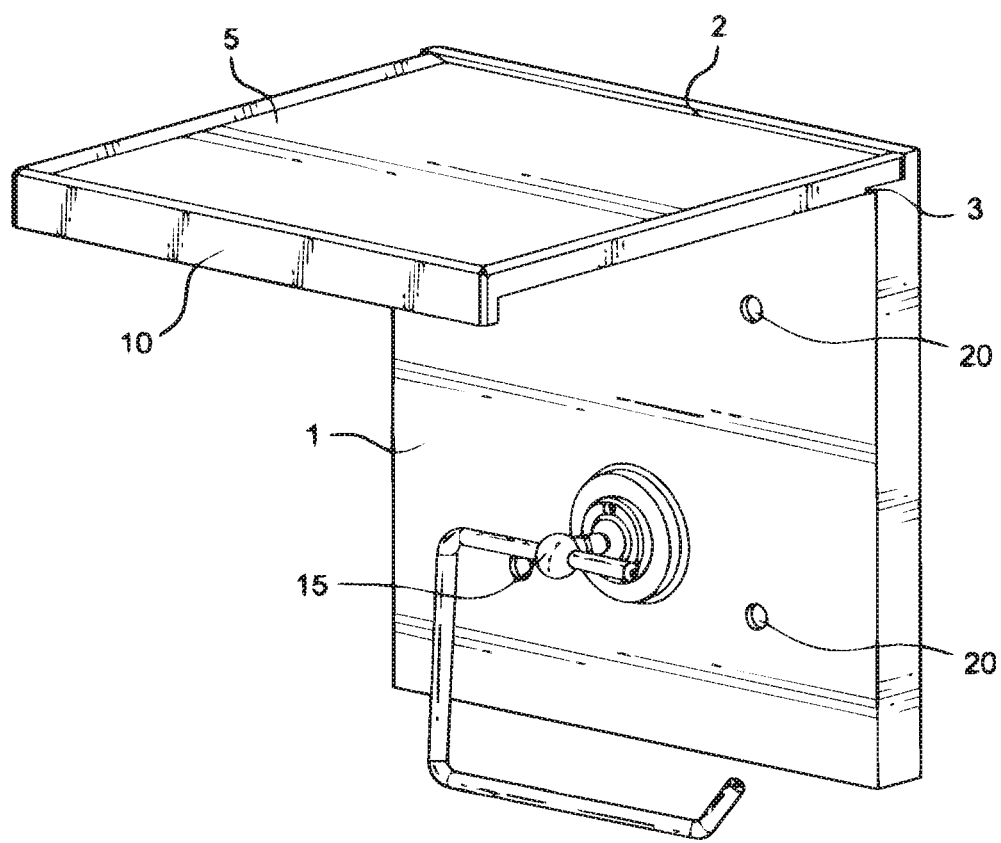
FIG. 1 is a perspective view of a shelf system in the form of a concealed shelf shown in an open position, according to an embodiment of the present disclosure.

The present disclosure now will be described more fully hereinafter with reference to the accompanying drawings, in which exemplary embodiments of the disclosure are shown. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art.

For convenience of description, the terms "front", "back", "upper", "lower", "top", "bottom", "front", "rear", "right", "left", "side" and words of similar import will have reference to the various members and components of the shapewear garment of the present disclosure as arranged and illustrated in the figures of the drawings and described hereinafter in detail.

It should also be understood that the terms "about," "approximately," "generally," "substantially" and like terms, used herein when referring to a dimension or characteristic of a component of the present disclosure, indicate that the described dimension/characteristic is not a strict boundary or parameter and does not exclude minor variations therefrom that are functionally the same or similar, as would be understood by one having ordinary skill in the art.

FIGS. 1-5 show embodiments, and corresponding advantages, of the shelf system according to the present disclosure, wherein like reference numerals refer to like elements.

In an embodiment, FIG. 1 shows a shelf system in the form of a concealed shelf in an open position. The shelf system comprises a housing 1 and a folding shelf or tray 5. The tray 5 has a top surface, a bottom surface (not shown), a first side, and a second side. The second side engages the housing 1 which has a face, backside (not shown), and at least one sidewall. The housing 1 has a cavity defined by an interior surface of the face, backside, and at least one sidewall for receiving the tray 5. The cavity generally extends into the housing and is configured to accept the tray in a closed position.

In an embodiment, the backside of the housing is separate from the sidewalls. The backside can be mounted to a surface and the sidewalls and face can attach to the mounted backside.

In an embodiment, the second side of the tray 5 has at least one wheel (not shown) where the wheel is configured to engage the cavity of the housing. In an alternative embodiment, the wheels operate within a track (not shown) to facilitate the movement of the tray 5 into and out of the cavity, such that the tray does not bump the sides of the cavity.

In another embodiment, the tray 5 has one or more peripheral edges and the housing cavity has an interior with a plurality of surfaces. When the tray 5 is in the concealed position, one or more of the peripheral edges are in close proximity with one or more of the interior surfaces of the cavity. These peripheral edges in close proximity are attached to a track to facilitate the sliding engagement of the tray 5 to the housing 1 or housing cavity.

In another embodiment, the housing 1 has a lip 2 generally perpendicular from the backside, extending outwardly from the backside towards the face. The lip 2 partially covers the opening of the cavity between the backside and the face of the housing 1. When the tray 5 is pulled out of the cavity, in the open position, the top surface of the second side of the tray 5 engages the lip 2 of the housing 1 while the bottom surface of the tray 5 includes a notch 3 that engages the housing 1 and acts as a fulcrum while the lip 2 prevents the second side of the tray 5 from flipping up beyond an open position. The tray 5 is cantilevered outward from the housing 1. In an alternative embodiment, the housing 1 has a cap adapted to cover the open side of the housing. The cap is used to close the opening to the housing cavity such that it will prevent debris or fluids from entering the housing cavity.

In an embodiment, the tray 5 is removably attached to the cavity of the housing 1. When a user grabs the tray to pull the tray 5 out of the housing 1 into the open position, the tray 5 can be completely separated from the housing 1. The tray 5 can then be used as a separate surface to rest objects on away from the housing 1.

In another embodiment, the track is crimped at the open end of the housing 31 cavity where the tray 5 extends. The crimp in the track prevents the wheels from continuing beyond the length of track and acts to hold the tray 5 in the open position while the point where the face contacts the bottom surface of the tray acts as a fulcrum point.

In an embodiment, the first side 10 of the tray 5 has a handle 13 that extends outwardly therefrom. The handle 13 allows a user to easily grab the first side of the tray 5 when pulling the tray 5 out of the housing cavity. In an alternative embodiment, the tray 5 has a channel (not shown) in close proximity to the first end 10 of the tray 5 to allow the user easily hold the tray 5 when pulling the tray 5 out of the housing cavity.

In another embodiment, the tray 5 has at least one pivot point where a pin (not shown) extends from the interior surface of the face of the housing, through the tray 5, and into the interior surface of the backside of the housing 1. The tray 5 is then pivotally removed from the housing 1 through a sidewall.

In an embodiment, the top surface of the tray 5 textured such that the texture will prevent objects placed thereupon from slipping. In an alternative embodiment, the top surface of the tray 5 has a non-slip coating.

In an embodiment, the tray 5 has a plurality of regions. The regions are configured to hold an otherwise maintain objects. For example, the end of the tray 5 has a region with at least one aperture 9 extending from the top surface through to the bottom surface where the apertures 9 are of various size to accommodated toothbrushes, hair dryers, hair straighteners, curling irons, shaving razors, etc. In another embodiment, a region of the tray has one or more depressions 8 to accommodate small objects and prevent them from being easily knocked off of the tray 5. In an alternative embodiment, the regions are separate sections that releasably engage the first side of the tray 5. Clips, fasteners, or screws are examples of attachment mechanisms to attach the releasably region to the front side 10 of the tray 5.

In another embodiment the concealed shelf has multiple trays within the housing. Each tray may be supported within the housing by sliding tracks or sliding brackets. In an alternative embodiment each of the trays are removably engaged with the housing.

In an embodiment, the tray 5 is lifted out of the housing and laid in an open position where foldable supports extend from the bottom of the tray 5. The foldable supports unfold from the bottom of the tray 5 and when the tray 5 is removed from within the housing 1. A side of the foldable support extends outward from the bottom of the tray 5 and engages the face of the housing to support the tray 5 in an open position. The combined weight of the tray 5 and items (not shown) placed on the tray 5 is thereby transferred to the face of the housing through the support.

Figure 2:
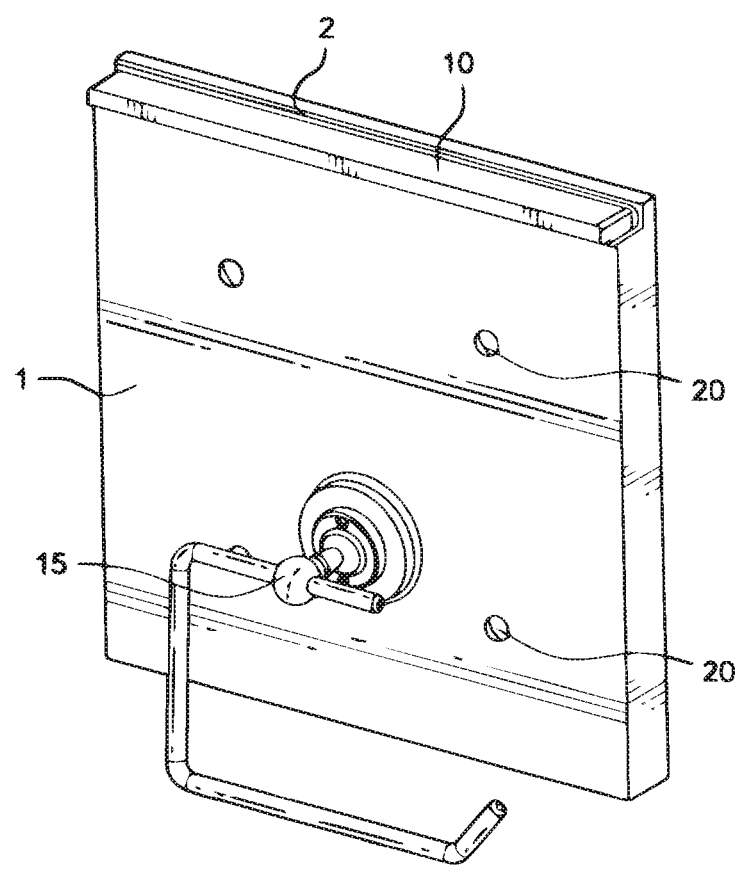
FIG. 2 is a perspective view of the concealed shelf of FIG. 1 shown in a closed position.

In an embodiment, FIG. 2 shows the tray 5 in a closed position within the housing 1. The first side 10 of the tray 5 extends slightly out of the housing 1, such that it may be pulled from the housing 1 by the first side 10.

In an embodiment, the concealed shelf has a holder 15 for personal hygiene tissue, toilet paper, a towel, or cloth on the holder 15 to allow for readily accessible use. The holder 15 is attached to the housing 1 and extends outwardly from the face of the housing 1. The holder 15 has a holder base that is attached to the face of the housing 1 with at least one generally cylindrical rod that extends outwardly from the holder base. The rod is generally, bent at a right angle and then extends from the bend parallel to the face of the housing 1.

In an alternative embodiment, the holder 15 has a base with a generally cylindrical rod in an annular shape where a first end of the rod extends outward from the base in an annular direction such that the first end connects back to the base at a second point forming a loop.

In an embodiment, the concealed shelf has a mount (not shown). A first end of the mount attaches to the backside of the housing 1 and extends outwardly therefrom. A second end of the mount is configured to engage a surface. For example, the second end of the mount may engage a wall where the mount is attached to the wall extending the concealed shelf outwardly from the wall. In an alternative embodiment, the second end of the mount is configured to engage the pedestal of the sink (not shown). The mount has generally annular clamps that will engage the external circumference or surface of the pedestal of the sink allowing the concealed shelf to be installed on the pedestal sink and extend outwardly past the outer diameter of the sink rim. In an alternative embodiment, the mount can removably engage a surface where the mount does not require penetration of the surface. Adhesives are installed on the second end of the mount and the second end of the mount is configured to removably adhere to the surface. Another example is at least one suction cup on the second end of the mount that can adhere to a flat surface using the vacuum suction of the suction cups on the mount.

In an embodiment, the concealed shelf is installed on a bathroom vanity. The vanity has one or more surfaces where the backside of the housing 1 is attached to at least one of the surfaces of the vanity. In another embodiment, when the tray 5 is pulled from the housing 1, the tray 5 surface is coplanar with a sink surface or usable surface of the vanity.

In an embodiment, the concealed shelf is attached to a surface using at least one sliding clip (not shown). The backside of the housing and the mounting location have corresponding parts of the sliding clip. The housing 1 can slideably engage the sliding clip as an attachment to a surface.

In another embodiment, the concealed shelf has at least one mounting hole 20 in the face of the housing and the backside (not shown) of the housing. The mounting hole 20 in the face of the housing 1 is larger that the mounting hole in the backside of the housing 1 such that a user is able to access a screw or other attachment device extending through the mounting hole of the backside. The mounting hole of the backside is small to allow the shank of a screw or mounting device to pass through, but small enough to be held in place by the head of the screw.

In use, the concealed shelf is installed on a surface in a desired location. A user then grabs the first side 10 of the tray 5 exposed through the housing 1. The user then pulls the tray 5 in a general upward direction and outwardly from the housing cavity. When the user has pulled the majority of the tray 5 out from the housing, the tray 5 is then pulled outwardly in a decreasing angle, pivoting along the edge of the housing 1, towards a parallel position with the floor of the room in an embodiment. The tray 5 will then rest in a level position relative to the floor of the room held at the second edge by the lip 2 of the housing 1 and the notch 3 engaging the housing 1. Objects can then be placed on the top surface of the tray 5 and used as needed. In an alternative embodiment, at least one foldable support will extend outwardly from the bottom surface of the tray 5 and support the tray 5 against the face of the housing 1 in a level position relative to the floor of the room. In another embodiment, the tray 5 has a handle 13, such as a bar, for the user to hold onto as they pull the tray 5 from the housing 1.

When the user no longer requires objects to be placed on the tray 5, the first side of the tray 5 is lifted upward relative to the floor, from the level position. When the tray 5 is lifted the second side of the tray 5 will begin to enter the housing cavity. The user continues to lift the tray 5 in an upward direction while simultaneously lowering the tray 5 into the housing cavity. The tray 5 continues into the housing cavity until it rests on the bottom of the cavity only the first side 10 of tray 5 is exposed from the housing 1.

In an embodiment, the concealed shelf provides rerouted electrical power. In one embodiment, the housing 1 has one or more electrical outlets 30. In another embodiment, the tray 5 surface has one or more electrical outlets 30. In yet another embodiment, the tray 5 and housing 1 each comprise one or more electrical outlets 30. The conceal shelf has a power source such as a battery holder to accept one or more batteries. The one or more batteries are in electrical communication with the one or more electrical outlets 30. In an embodiment, at least one electrical out 30 has one or more universal serial bus (USB) connection ports. In another embodiment, the connection ports of the electrical outlet 30 are configured and adapted to provide power for an electrical device.

In an alternative environment, the concealed shelf is electrically connected into an existing electrical infrastructure of the structure to which is it installed. In this embodiment, the one or more electrical outlets 30 are in communication with one or more electrical leads that extend beyond the housing 1 to allow a user, during installation, to connect the electrical leads to existing electrical wiring within the structure.

In another embodiment, the one or more electrical outlets 30 are in communication with one or more electrical leads extending beyond the housing 1. The terminal end of the electrical leads is a plug adapted to plug into an electrical outlet existing in/on the structure to which the concealed shelf is installed. In this embodiment, the concealed shelf acts to extend the capabilities of existing outlet capabilities of the room. For example, the concealed shelf is installed and the plug is inserted into an existing electrical outlet of the structure. The electricity travels through the electrical leads to supply the one or more electrical outlets 30 of the concealed shelf with power to be used by the user.

Figure 4:
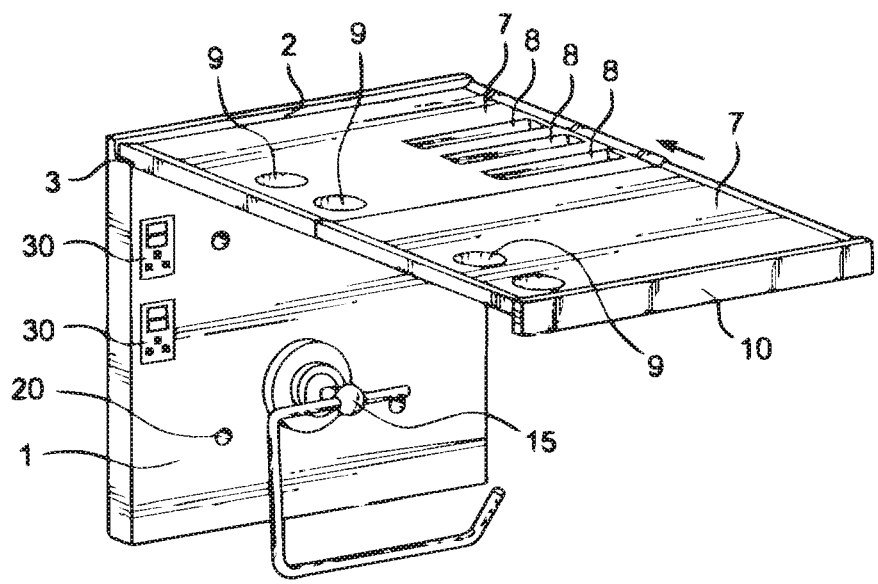
FIG. 4 is a perspective view of the concealed shelf, according to another embodiment of the present disclosure.

In an alternative embodiment, FIG. 4 illustrates the concealed shelf having a telescoping tray 7 having multiple sections contained within one another. The first side 10 of the outermost tray section is exposed, slightly above the housing cavity, when the telescoping tray 7 is in a concealed position allowing tactile access to extracting the telescoping tray 7 from the cavity. Sections of the tray may include a first section located nearest to the housing and, in an embodiment, this is the section to remain in contact with the housing when the tray is in the open position. There may be a plurality of intermediate sections between the first section and the outermost section. Each section of the telescoping tray 7 has a sectional upper surface, a sectional bottom surface, and one or more sidewalls extending from the sectional bottom surface to the sectional upper surface. Each section further comprises an interior cavity defined by an interior surface of each sectional surface. The cavity is configured to accept subsequent sections of tray 7 where a subsequent section of telescoping tray 7 extends from the sectional cavity, when in use, and matingly engages the same cavity when in a concealed position. Each section of the telescoping tray 7 surface also has a means for preventing subsequent sections from being completely removed. For example, a means for preventing subsequent section from being completely removed is a clip or protrusion in communication with each subsequent tray section, whereby the clip or protrusion is adapted to engage subsequent tray sections thereby preventing the subsequent sections from being severed from the complete tray.

In another embodiment, the outermost section has one or more attachment components adapted to attach each section of the telescoping tray 7 to one another. For example, an attachment component is a clip, spring-biased button, magnetic connection, or a wire traveling through either tray section where the wire allows individual movement for each of the telescoping tray 7 sections until fully extended and the wire becomes taught.

In an embodiment, when the telescoping tray 7 is in the concealed position, each section of the tray surface telescopically engage one another reducing the overall surface area of the tray. This reduced surface area tray is then slid into the housing cavity. In this embodiment, the telescoping tray 7 allows for a reduced size of the housing 1 to accommodate a reduced telescopic tray 7 surface.

In an alternative embodiment, the concealed shelf has a multi-sectional tray with one or more sections in communication with one another allowing the one or more section to fold or slide onto one another. In this embodiment, a user is able to adjust the physical surface area of the tray by folding or slide sections of the tray onto one another where the tray surface area is reduced as the tray is folded or slid onto another section.

Figure 3:
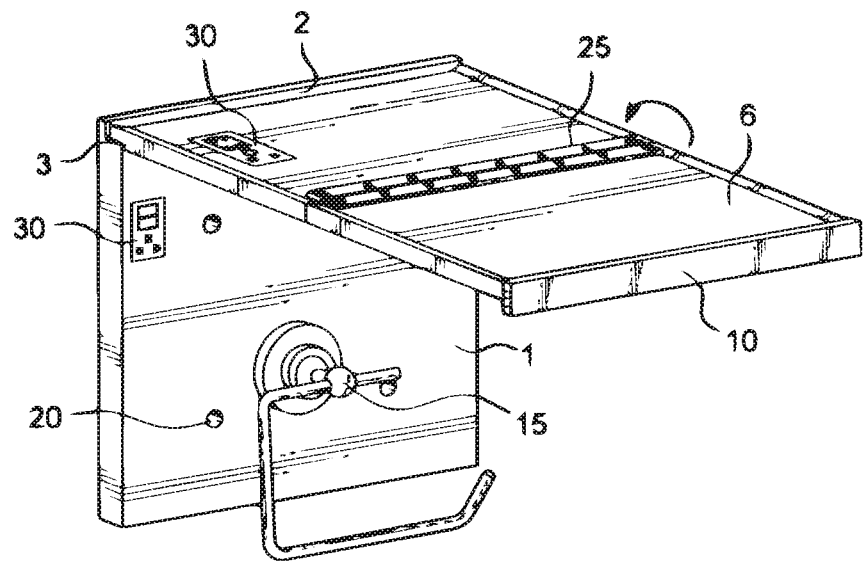
FIG. 3 is a perspective view of the concealed shelf, according to another embodiment of the present disclosure.

In another embodiment, FIG. 3 illustrates a concealed shelf wherein each section 6 of the folding or sliding tray surface are attached to one another. The attachment for a folding shelf surface is one or more hinge style attachments. For example, a first section of the tray is located farthest from the housing when the tray is in an open position. This first section has a proximal side connected to a side of a hinge 25. Another side of the hinge 25 is attached to a distal side of the second section of the tray. When a reduced tray surface area is required, the first section of the tray is folded onto the second section of the tray. In another embodiment, each section of the tray surface slides onto one another. For example, each section tray has one or more pivot points where two sections of surface connected by a pivot pin are capable of rotating relative to one another thereby reducing the surface area of the tray surface.

Figure 5:
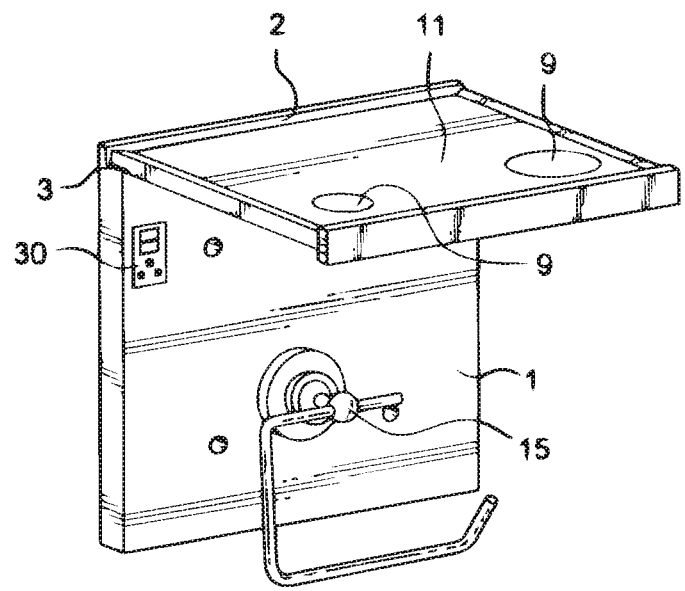
FIG. 5 is a perspective view of the concealed shelf, according to another embodiment of the present disclosure.
Figure 6:
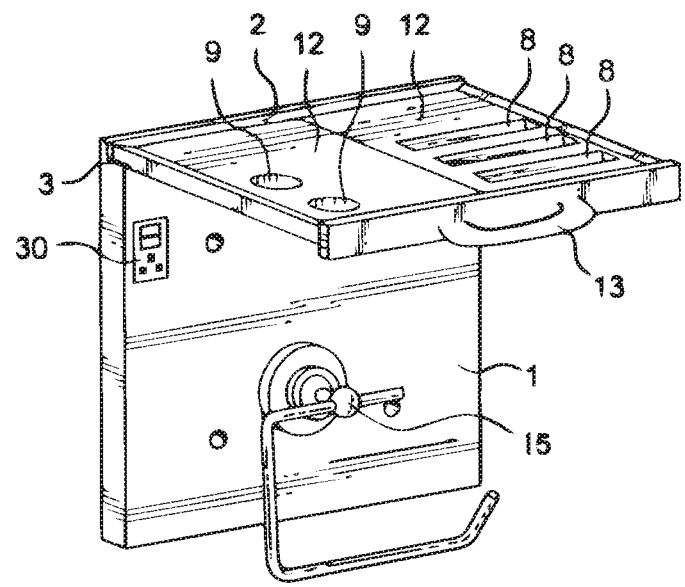
FIG. 6 is a perspective view of the concealed shelf, according to another embodiment of the present disclosure.

FIGS. 5-6 illustrate the concealed shelf having a tray 11 with an adaptable surface wherein at least one aperture 9 extends through the tray surface. In other embodiments, the tray surface has one or more depressions 8 extending into the tray surface 12. In an embodiment, the concealed shelf has a handle 13 in communication with the tray to facilitate transition of the concealed shelf from an open position to a close position.

Housing 1 and tray 5 described herein may be manufactured of suitable rigid non-yielding materials. For example, these components made be made of a suitable plastic material, such as polyurethane plastic or acrylonitrile butadiene styrene (ABS) plastic. Alternatively, these components may be made of extruded rigid metal, such as aluminum.

It will be appreciated that the shelf system described above with reference to FIGS. 1-6 can be fabricated with varying dimensions, shapes and using various types of materials so as to achieve a compact and portable design suitable for being easily transported and assembled for use. For example, in one particular embodiment of the shelf system suitable for use in small areas, such as bathrooms, for example, housing 1 has a length (between opposite sidewalls) of about 15.0 inches and a height of about 12.6 inches, and tray 5 has a length of about 12 inches and a width of about 12 inches. It will be understood that these dimensions can be made smaller or greater depending on the materials selected and the particular application for the shelf system.

The shelf system described above with reference to FIGS. 1-6 can be also easily assembled for use and disassembled (collapsed) during periods of non-use (e.g., tray 5 is stored and concealed inside housing 1 as described above.

FIGS. 7-18 show another embodiment of a shelf system, generally designated at 100, according to the present disclosure, wherein like numerals represent like elements.

Figure 7:
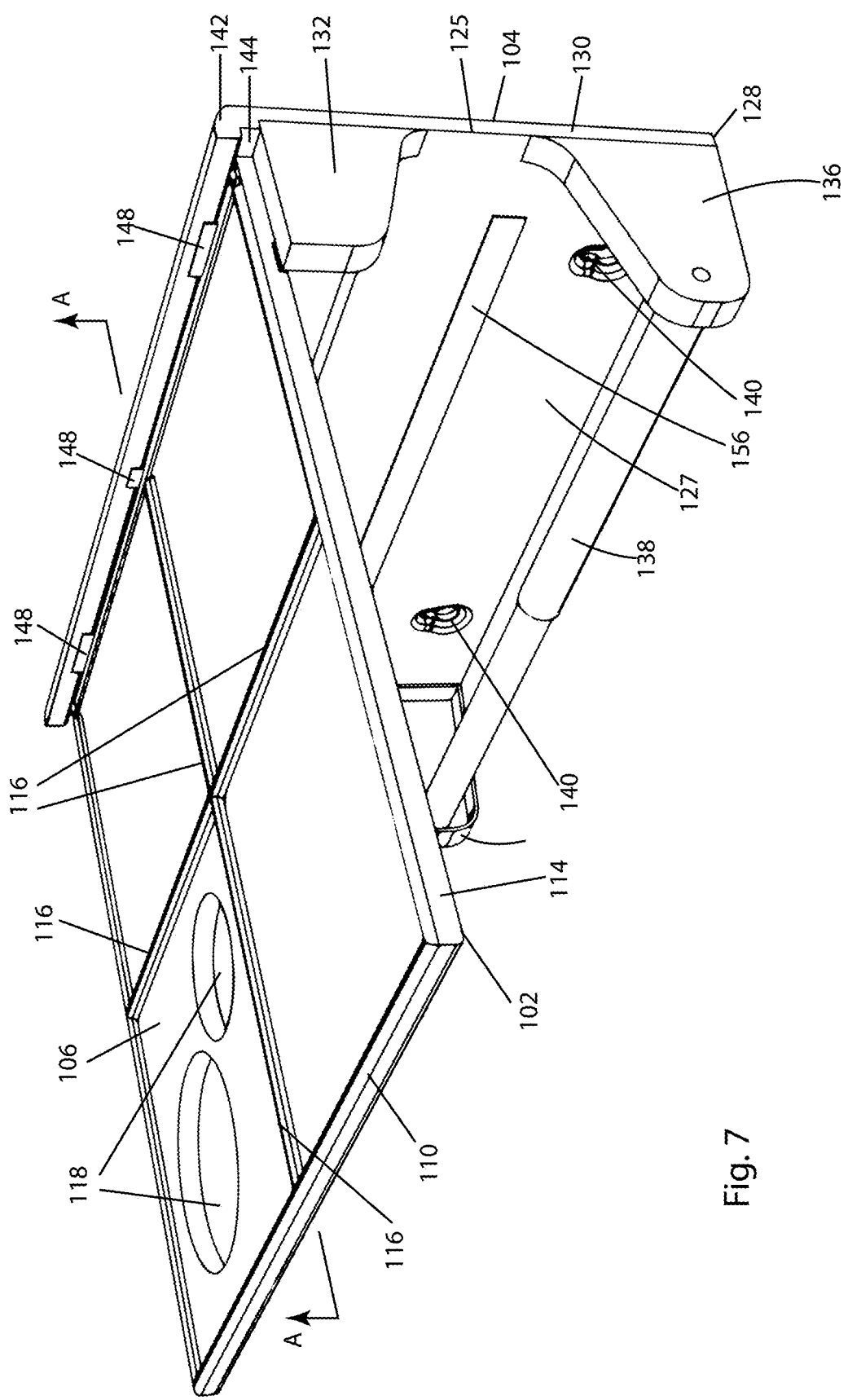
FIG. 7 is a perspective view of a shelf system, including a shelf component and a support frame component, according to another aspect of the present disclosure, with the shelf system shown in an assembled state during use.
Figure 8:
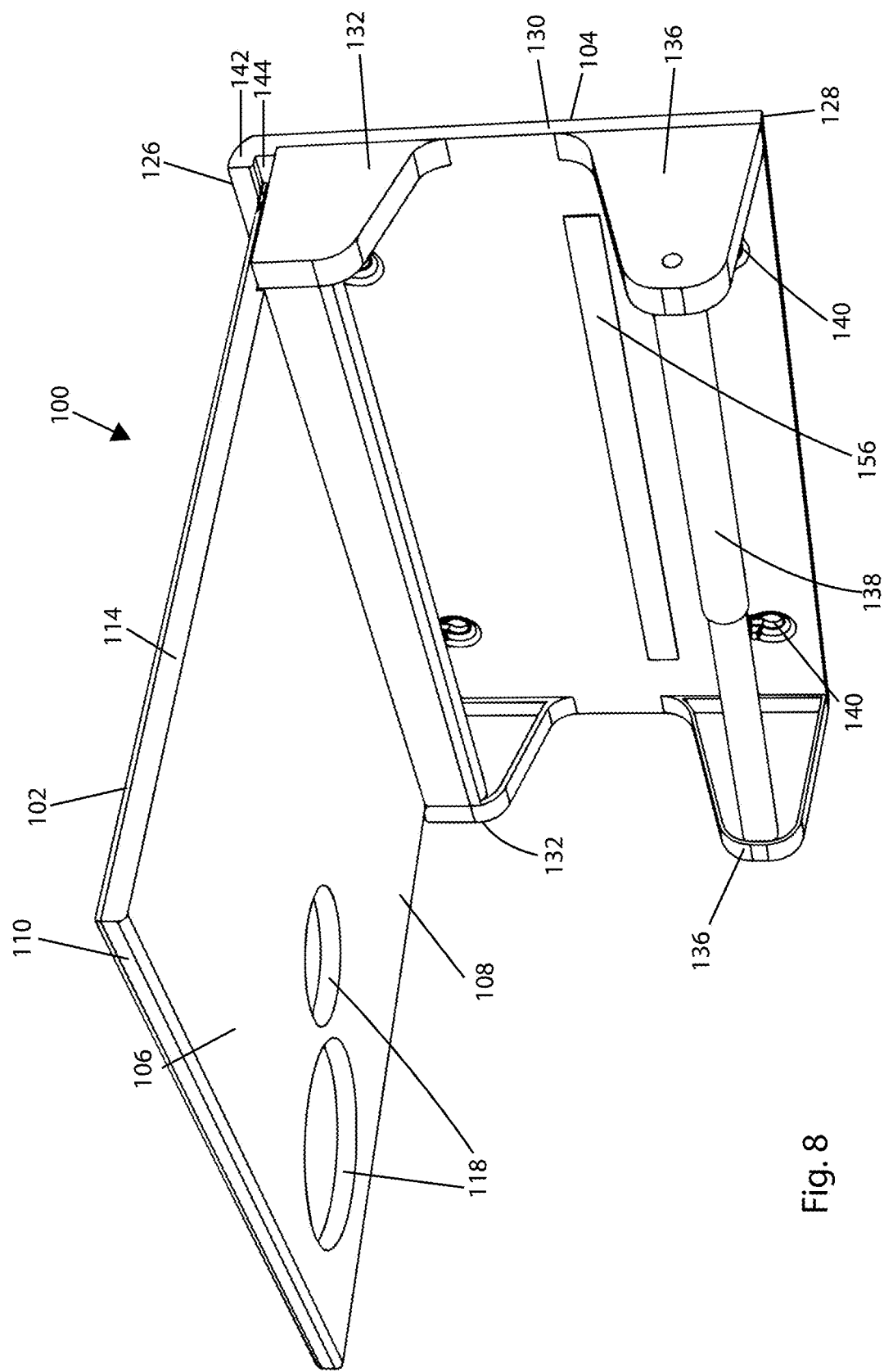
FIG. 8 is another perspective view of the shelf system shown in FIG. 7.
Figure 9:
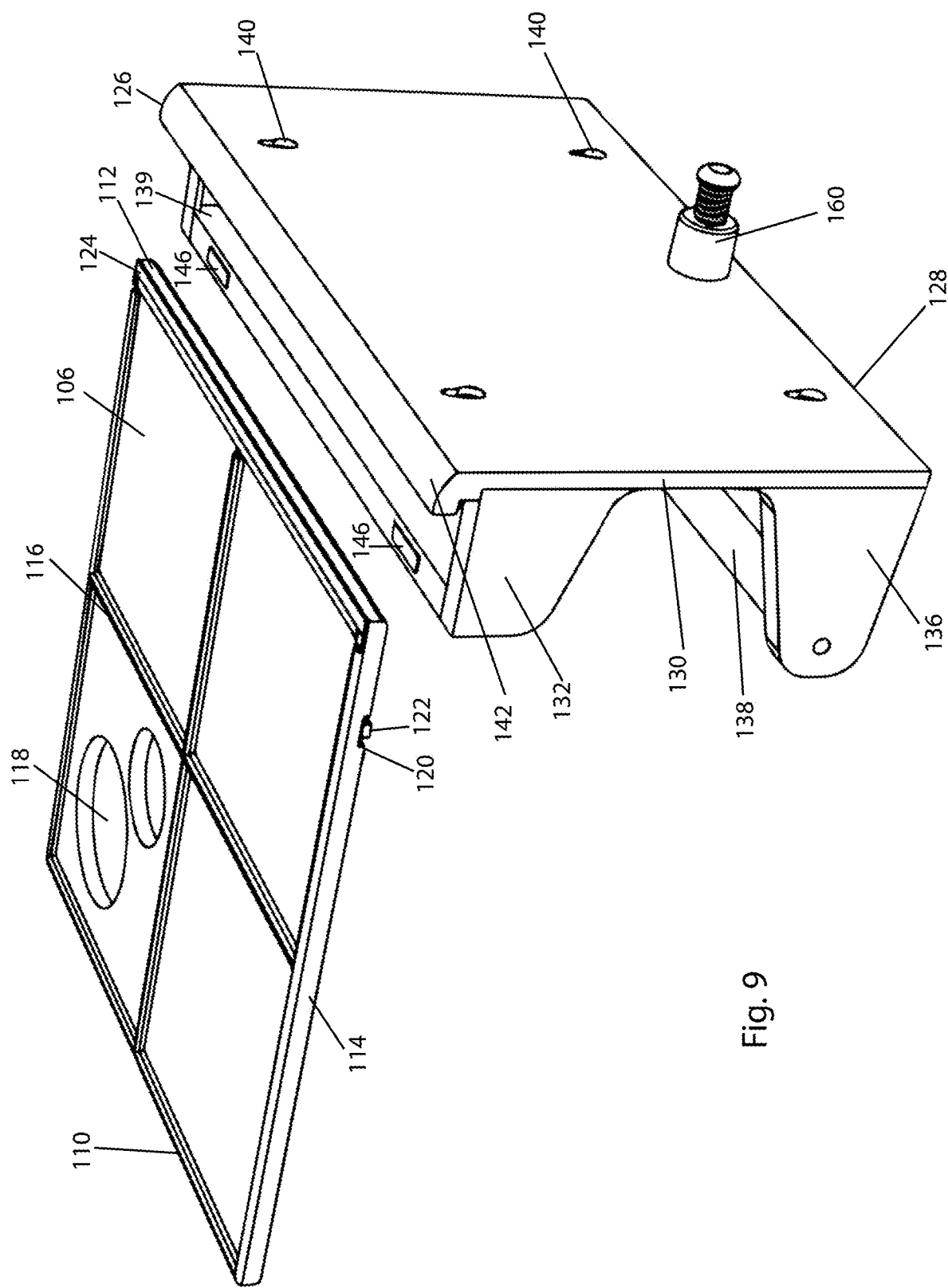
FIG. 9 is another perspective view of the shelf system of FIG. 7, but with the shelf component being disconnected/separated from the support frame component.
Figure 10:
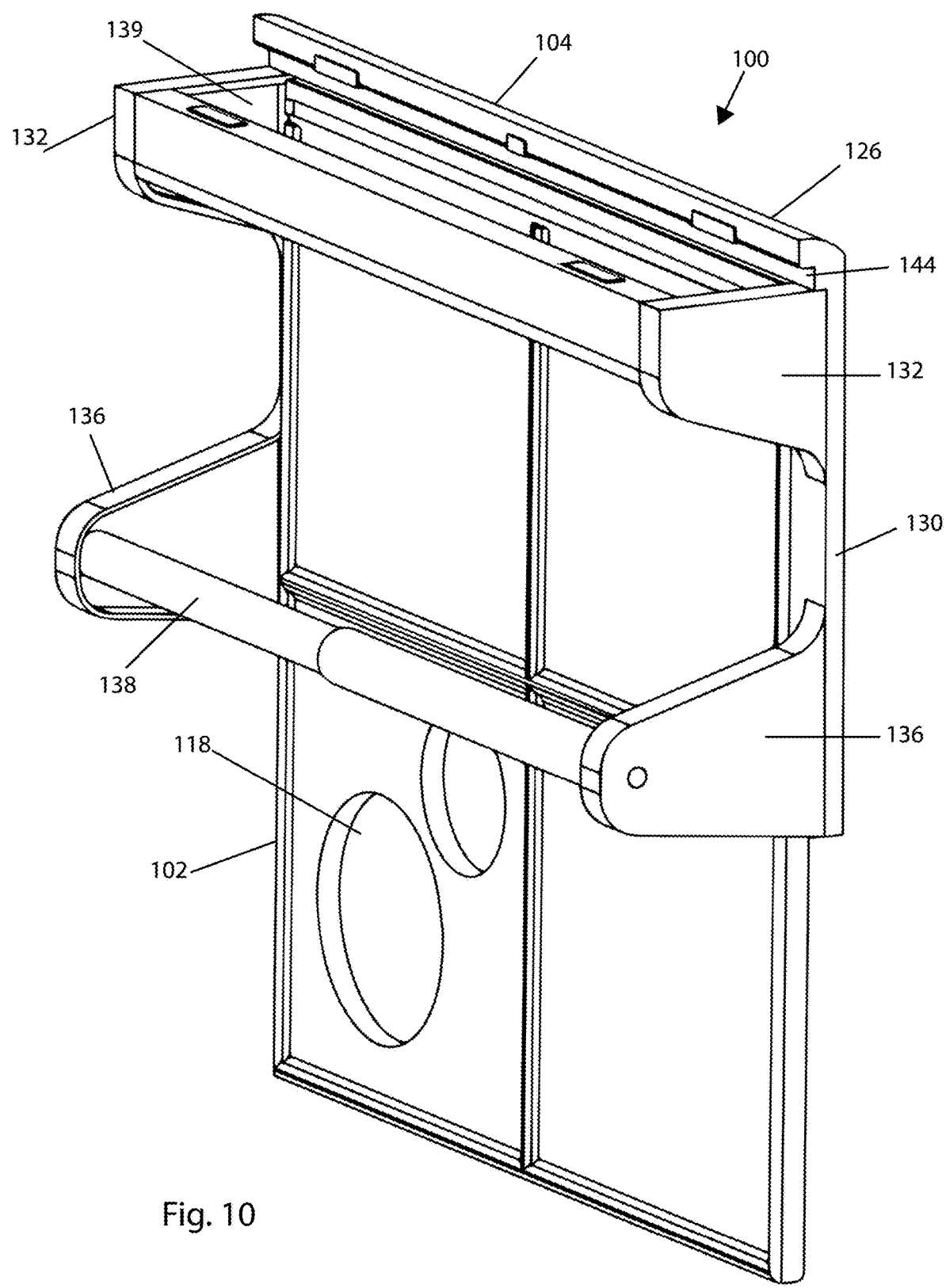
FIG. 10 is a perspective view of the shelf system of FIG. 7, but with the shelf component being stored relative to the support frame component.
Figure 11:
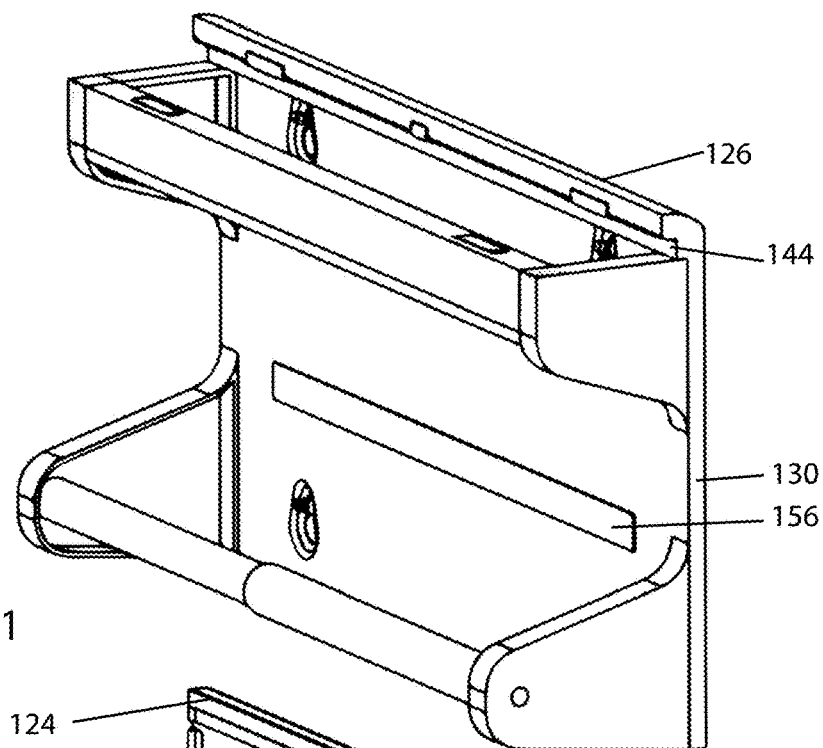
FIG. 11 is a perspective view of the housing of the shelf system of FIG. 7.
Figure 12:
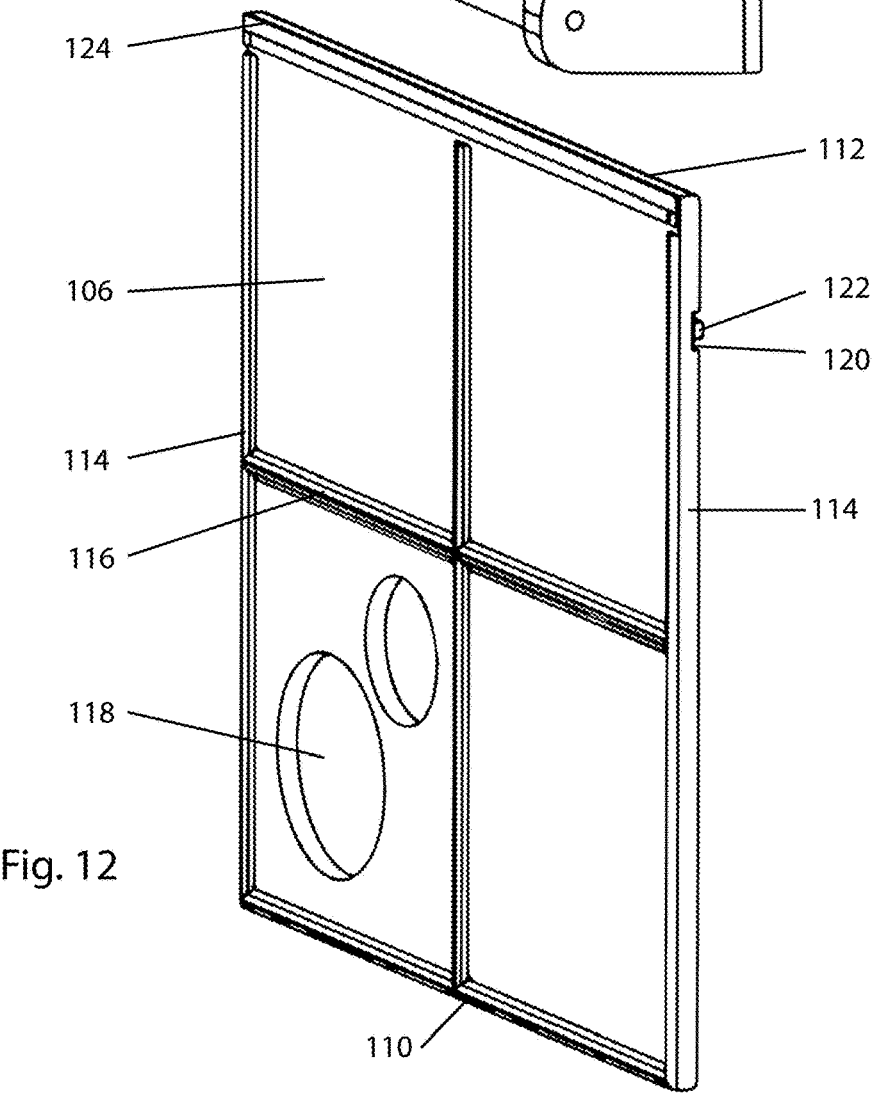
FIG. 12 is a perspective view of the shelf component of the shelf system of FIG. 7.
Figure 14:
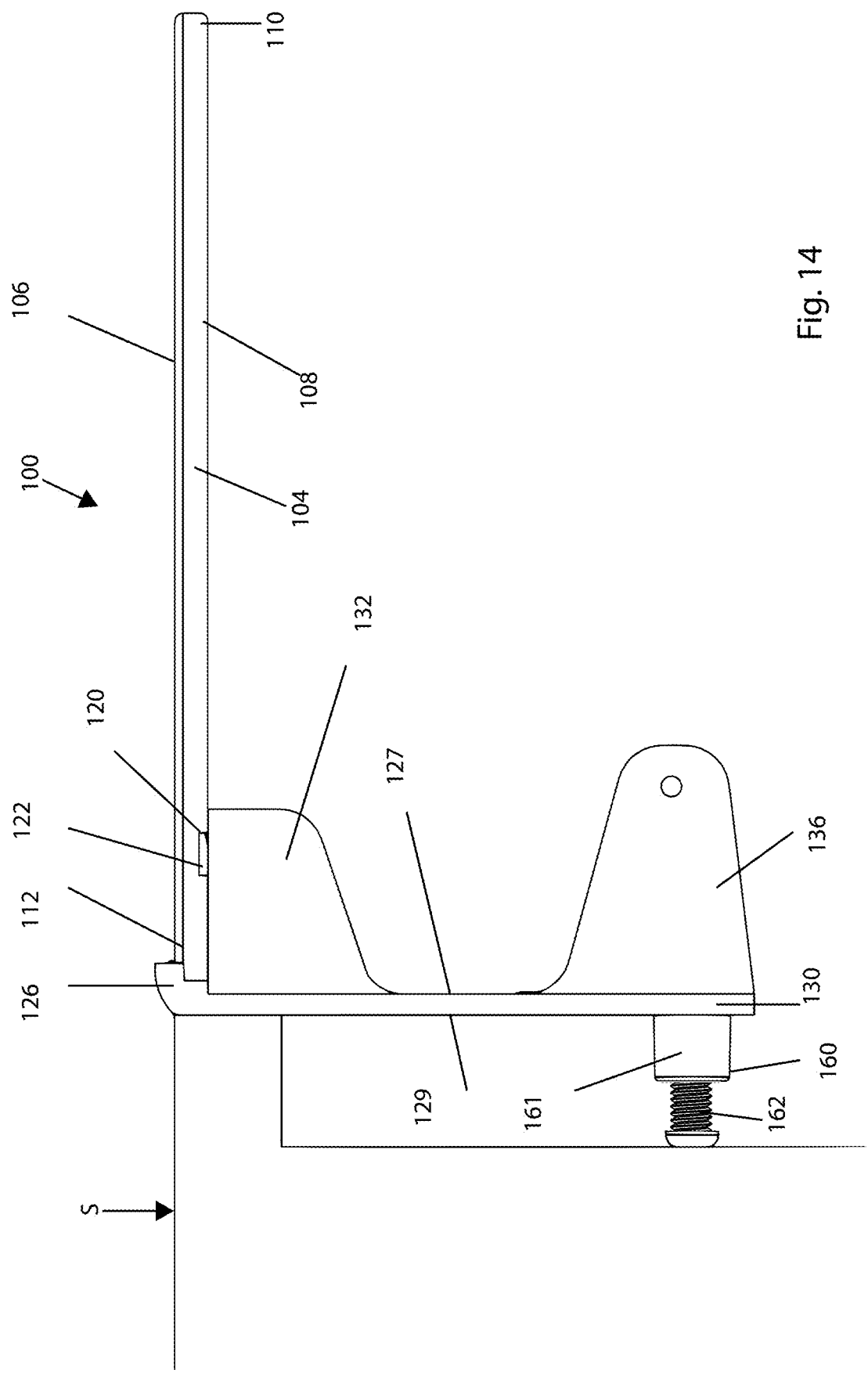
FIG. 14 is a side view of the shelf system of FIG. 7, further illustrating the shelf system being mounted to a fixed structural surface.
Figure 15:
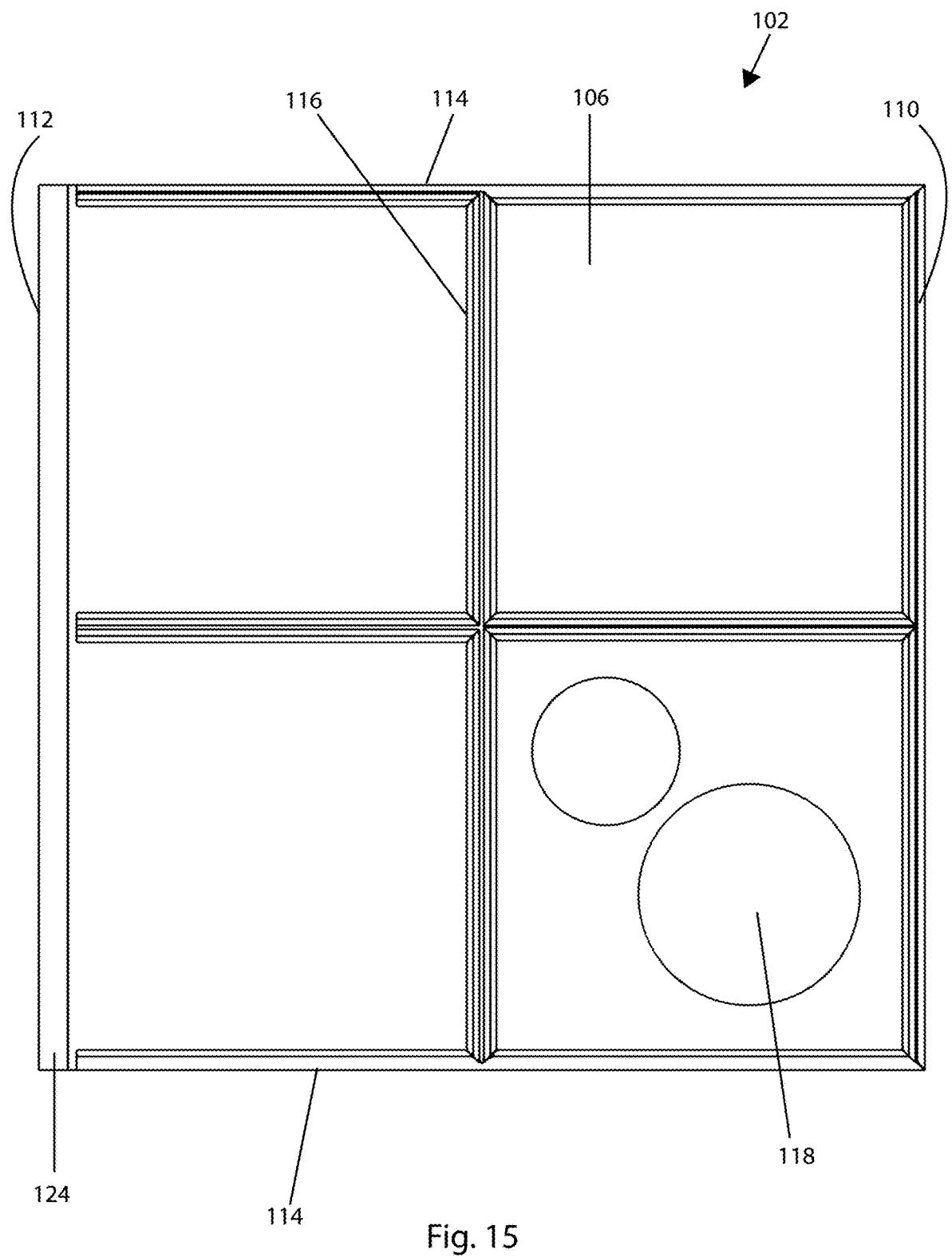
FIG. 15 is a top view of the shelf component of the shelf system of FIG. 7.

Shelf system 100 includes a tray or shelf component 102 and a support frame component 104. In an assembled state of shelf system 100, as shown in FIGS. 7, 8 and 14, support frame component 104 is configured to removably support shelf component 102 in a cantilevered fashion. In the present disclosure, "cantilevered fashion" refers to shelf component 102 being securely mounted to support frame component 104 at one end and hanging free at the other end. In a disassembled state of shelf system 100, shelf component 102 is completely removed from support frame component 104 as shown in FIG. 9, or alternatively stored relative to support frame component 104 as shown in FIG. 10. The assembled and disassembled states of shelf system 100 are described in more detail below.

Referring to FIGS. 7-9, 11, 12 and 14-17, shelf component 102 has a top surface (top) 106, a bottom surface (bottom) 108, a front end 110, a rear end 112 and sides 114. The top 106 is divided into multiple regions (four shown in this embodiment) by separating elements 116 extending between front and rear ends 110, 112 and sides 114. One of the regions includes apertures 118 extending from top 106 and bottom 108, for example similar to and for performing the same functions as apertures 9 described above with reference to the embodiment of FIGS. 4-6. In a modified form of this embodiment, one or more regions of top 106 may be provided with one or more depressions to accommodate small objects and prevent them from being easily knocked off of shelf component 106, as described above in connection with depressions 8 with reference to the embodiment of FIGS. 4 and 6. It is understood that apertures 118 and/or the depressions may be provided in one or more of the regions of top 106 without departing from the spirit and scope of the present disclosure.

Figure 16:
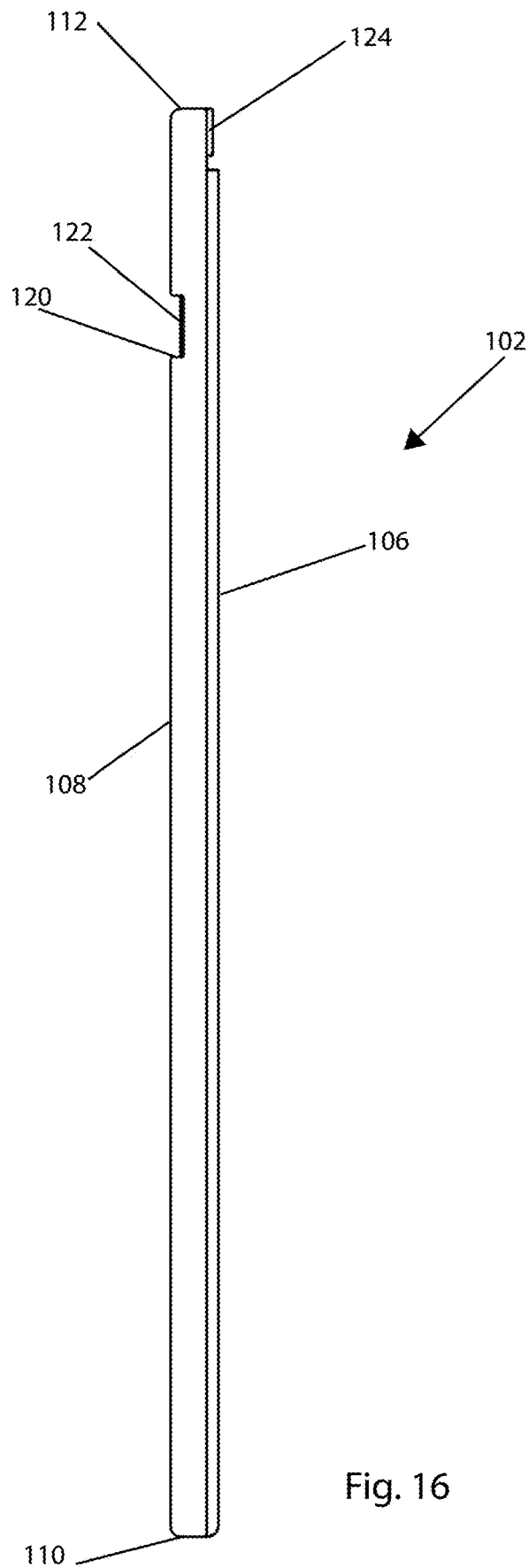
FIG. 16 is a side view of the shelf component of the shelf system of FIG. 7.
Figure 17:
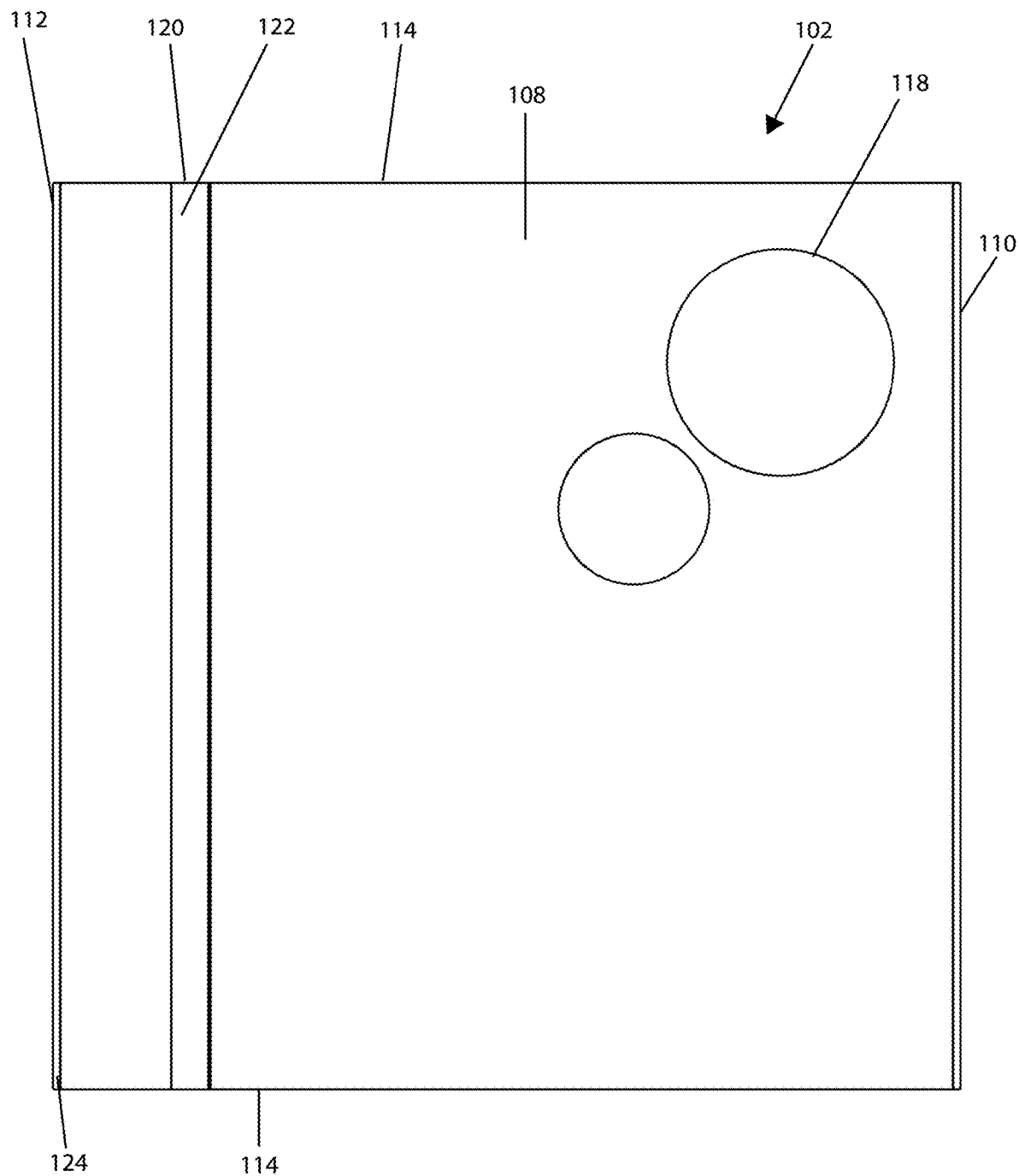
FIG. 17 is a bottom view of the shelf component of the shelf system of FIG. 7.

Referring to FIGS. 9, 12, 14, 16 and 17, a groove or notch 120 is formed in bottom 108 near rear end 112. In this embodiment, notch 112 extends from one side 114 to the other side 114 along a direction generally parallel to front and rear ends 110, 112 of shelf component 102. Notch 120 is configured to receive and retain (e.g., by friction fit or a suitable adhesive or fastener) a first metal strip 122 along its length thereof. As best shown in FIG. 16, a depth of notch 120 from bottom 108 of shelf component 102 is greater than a thickness of metal strip 112. By this construction, notch 120 is configured to receive and engage a cross member of support frame component 104 as further described below.

Referring to FIGS. 9, 12 and 15-17, a second metal strip 124 is securely mounted (e.g., by a suitable adhesive or fastener) on top 106 at rear end 112 of shelf component 102. In this embodiment, second metal strip 124 extends from one side 114 to the other side 114 along a direction generally parallel to notch 112. As discussed further below, first metal strip 122 (i.e., while notch 120 receives and engages the cross member of support frame component 104) and second metal strip 124 are configured to removably engage magnetic elements provided on support frame component 104 in the assembled state of shelf system 100. By this construction, notch 120, first and second metal strips 122, 124 as well as the cross member and magnetic elements, as well as other elements, of support frame component 104 serve to position and assist in retaining shelf component 102 in a cantilevered fashion relative to support frame component 104, as shown in FIGS. 7, 8, 14 and further described below.

The structural features and arrangement of support frame component 104 will be described with reference to FIGS. 7-11, 13 and 14.

Referring to FIGS. 7, 8 and 10-14, support frame component 104 is formed of a base panel 125 having a top end 126, a front side 127, a bottom end 128, a rear side 129 and lateral sides 130. A preselected number of mounting holes 140 are provided in panel 125 for releasably securing support frame component 104 to a surface of a fixed structure S, as shown in FIG. 14, using suitable fasteners (e.g., screws). In this embodiment, two mounting holes 140 are provided near top end 126 and two mounting holes 140 are provided near bottom end 128 of panel 125. It is understood, however, that other means for releasably securing support frame component 104 to fixed structure S, such as Velcro connectors and/or double sided tapes, are suitable.

Figure 18:
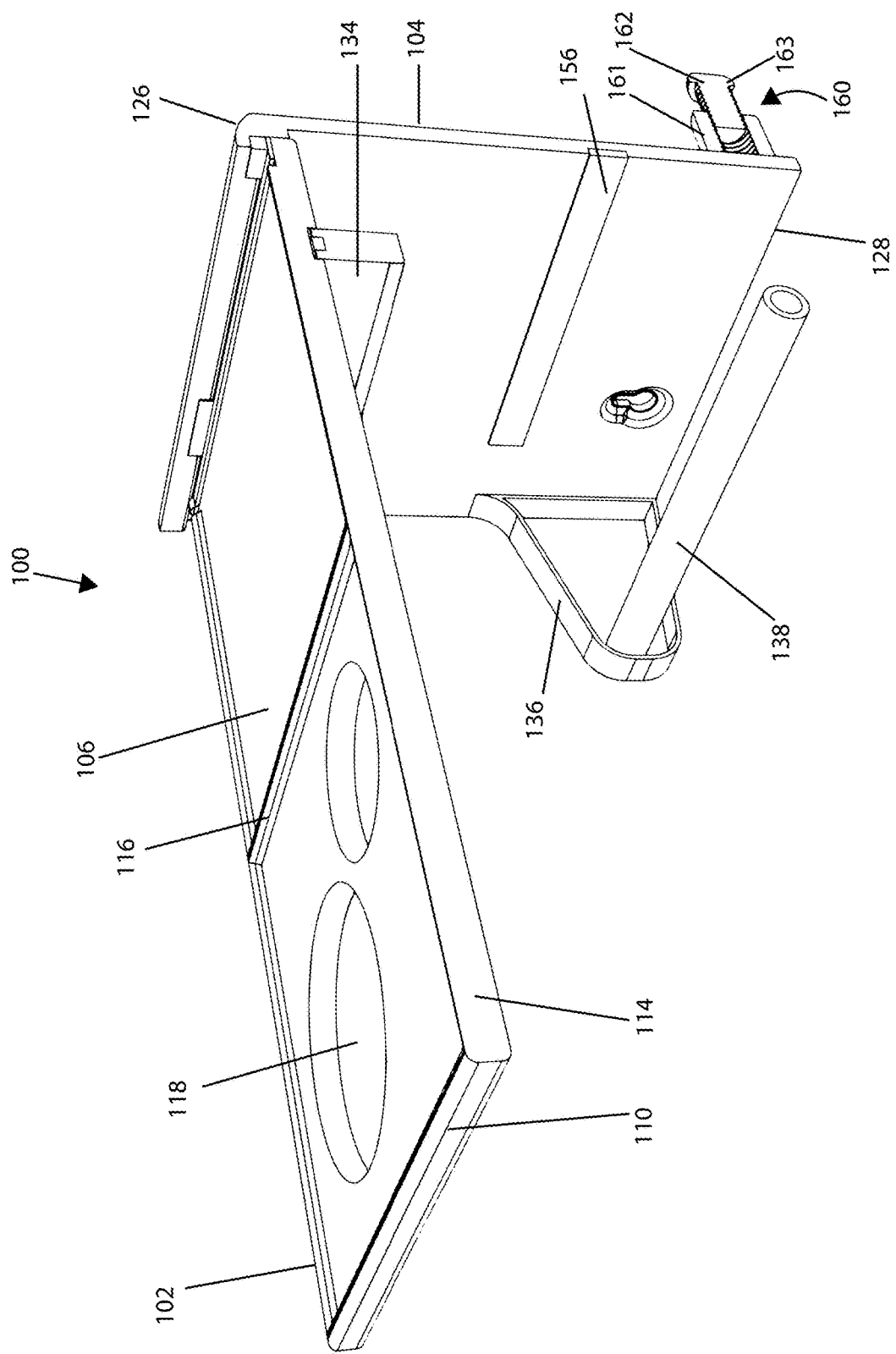
FIG. 18 is a cross-sectional view of the shelf system taken along the line A-A in FIG. 7.

As shown in FIGS. 14 and 18, an adjustable stabilizing element 160 is provided on rear side 129 of panel 125 for providing stability to shelf system 100 while mounted to fixed structure S. In this embodiment, stabilizing element 160 comprises a cylindrical tube 161 having an internal thread and a threaded element 162 (e.g., adjustable screw) for threaded engagement with the internal thread of cylindrical tube 161. Specifically, threaded element 162 is threadably and rotatably mounted within cylindrical tube 161 so as to be operable to rotate in a first direction relative to cylindrical tube 161 such that threaded element 162 advances towards fixed surface S until a head portion 163 of threaded element 162 contacts fixed surface S. Threaded element 162 is also operable to rotate in a second direction relative to cylindrical tube 161 such that threaded element 162 advances away from fixed surface S until head portion 163 disengages fixed surface S. It ill also be appreciated that stabilizing element 60 can be incorporated in the shelf system described above with reference to FIGS. 1-6.

The foregoing adjustable feature of stabilizing element 160 allows shelf system 100 to be readily stabilized and leveled relative to fixed surface S during use of shelf system 100. More specifically, stabilizing element 160 functions as a spacer or spacing element that helps keep the housing or panel aligned or flush parallel to surfaces that might have an overlapping lip such a bathroom vanity, work table, desk, or kitchen sink. What makes it a spacer is the threaded element (e.g., adjustable screw) attached to the rear of the shelf system which can be adjusted to the desired distance. Benefits of this configuration are that it helps with leveling the housing and tray both vertically and horizontally when in use so as to allow objects to be placed on and be retained on the tray. Additionally, the spacer keeps the shelf system from moving as it braces the shelf system and keeps it steady when it wedges the shelf system and the surface to which the shelf system is mounted.

Figure 13:
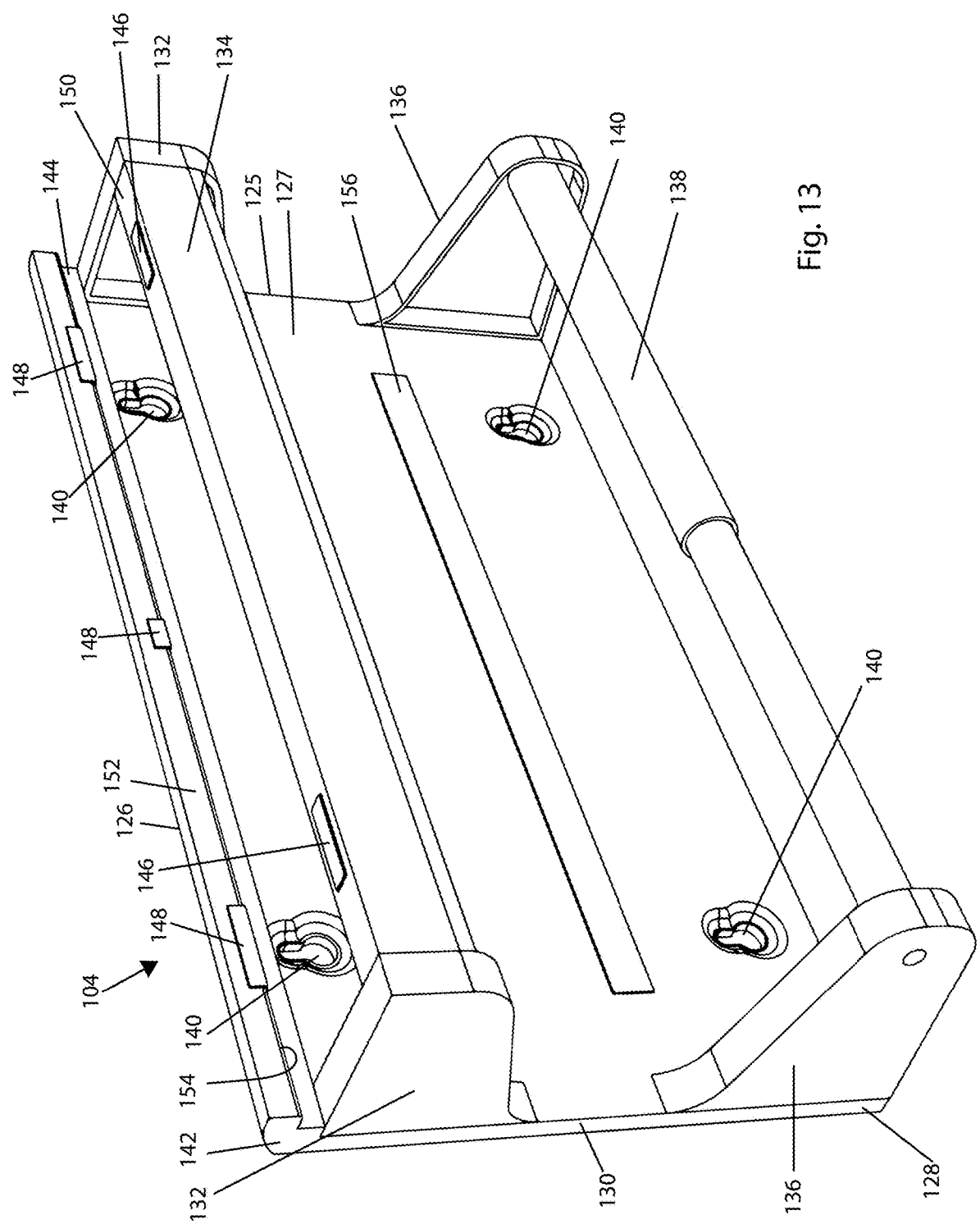
FIG. 13 is another perspective view of the support frame component of the shelf system of FIG. 7.

Referring to FIG. 13, top portion 126 of panel 125 is provided with an overturned portion 142 forming a recess 144 extending from one side 130 to the other side 130. Overturned portion 142 extends generally perpendicular relative to each of front side 127 and rear side 129. Recess 144 is configured to receive and retain a portion of rear end 112 of shelf component 102 in the assembled state of shelf system 100, as shown in FIGS. 7, 8 and 14. Overturned portion 142 extends generally perpendicular from panel 125

A first pair of support members 132 extend from front side 127 near top end 126 for removably supporting a horizontal cross member 134 between sides 130 as shown. A second pair of support members 136 extend from front side 127 near bottom end 128 for removably supporting a horizontal bar or rod 138 functioning as a holder for personal hygiene tissue, rolls of paper towel (e.g, toilet paper), a towel, or cloth for readily accessible use. For example, rod 138 can serve as a bathroom towel holder, clothing holder, etc. Rod 138 may be of the spring-loaded type, for example, for quick connection to and disconnection from support members 136. Alternatively, rod 138 may be removably connected to support members 136 using suitable fasteners. Likewise, cross member 134 may be removably connected to support members 132 using suitable fasteners, or by friction fit connection, for example. Different types (e.g., designs and shapes) of rods 138 and cross members 134 may be connected to corresponding support members 132, 136 without departing from the spirit and scope of the invention.

Support members 132 and 136 extend outwardly or project from front side 127 of panel 125 so that cross member 134 and rod 138 extend a preselected distance from front side 127 to define a space 139 therebetween. Space 139 is configured to receive shelf component 102 in a state in which shelf component 102 is disassembled from and stored relative to support frame component 104, as shown in FIG. 10. Thus FIG. 10 shows a configuration of shelf system 100. The preselected distance noted above is selected so that shelf component 102 can be easily inserted into and removed from space 139 with ease. In the stored configuration shown in FIG. 10, shelf system 100 has a streamlined profile adapted for easy storage of shelf system 100 during periods of non-use.

As shown in FIGS. 7-13, support frame component 104 is provided with magnetic elements 146, 148 configured to magnetically engage respective first and second metal strips 122, 124 of shelf component 102 in the assembled state of shelf system 100. Magnetic elements 146 (first magnetic elements) have a generally strip shape and are securely mounted to a surface 150 of cross member 134 for magnetically engaging first metal strip 122 of shelf component 102. Magnetic elements 148 (second magnetic elements) have a generally L-shape and are securely mounted to surfaces of overturned portion 142 of panel 125, with one portion of the L-shape being mounted to a side surface 152 provided exterior to recess 144 and the other portion of the L-shape being mounted to an inner surface 154 of recess 144. It will be appreciated that metal strips 122, 124 and magnetic elements 146, 148 define means for releasably securing shelf component 102 to support frame component 104 in the assembled state of shelf system 100.

A magnetic element 156 (third magnetic element) is also provided in a general mid-section of front side 127 between mounting holes 140 provided near top end 126 and mounting holes 140 provided near bottom end 128 of panel 125. Magnetic element 156 is in the form of a single, continuous strip of magnetic material configured to magnetically engage first metal strip 122 provided in notch 120 of shelf component 102 in the stored configuration of shelf system 100 shown in FIG. 10. In the assembled state of shelf system 100, magnetic element 156 is also configured to store/support (e.g., by magnetic attraction) various metallic items, such as cosmetic utensils, appliances, hardware and/or electronics.

Magnetic elements 146, 148, 156 are securely mounted on surfaces of support frame component 104 as described above and shown in the figures using various techniques. For example, magnetic elements 146, 148, 156 can be mounted using suitable fasteners or adhesives. For example, a suitable industrial grade adhesive for mounting magnetic elements 146, 148 and 156 to support frame component 104 is commercially available under the name E-6000 Multi-purpose Craft Glue manufactured by Eclectic Products, Inc.

Alternatively, utilizing known techniques, the magnetic elements can be securely mounted by being partially embedded in the surfaces of support frame component 104, such as shown in FIG. 18 for magnetic element 156, provided that the magnetic elements are exposed from the surfaces so as to be able to able to securely engage respective first and second metal strips 122, 124 of shelf component 102 with sufficient magnetic force so as to retain shelf component 102 securely in place both in the assembled state (including during use) (FIGS. 7-8) and in the stored state (FIG. 10) of shelf system 100.

In the present embodiment, two magnetic elements 146 and three magnetic elements 148 are provided. It is understood, however, that the number of magnetic elements 146, 148 may be varied so long as sufficient magnetic engagement is achieved between magnetic elements 146, 148 and metal strips 122, 124 of shelf components 102. For example, instead of using two magnetic elements 146, a single, continuous strip of magnetic material (e.g., similar to magnetic element 156) extending along the entire or a substantial portion of surface 150 of cross member 134 may be used. Similarly, the three magnetic elements 148 may be replaced by a single, continuous L-shaped magnetic element extending along the entire or a substantial portion of surfaces 152 and 154 of overturned portion 142 may be used. Likewise, instead of being formed of a single, continuous magnetic strip, magnetic element 156 may take the form of multiple magnetic elements (e.g., similar to magnetic elements 146, 148). Suitable materials may be selected for magnetic elements 146, 148 and 156 without departing from the spirit and scope of the present disclosure.

In a modification to shelf system 100 according to the present disclosure, support frame component 104 provides rerouted electrical power as described above for the concealed shelf in connection with the embodiments of FIGS. 3-6. In such modification, shelf component 102 and/or support frame component 104 are provided with one or more electrical outlets and a power source (e.g., a battery holder accepting one more batteries) in electrical communication with the one or more electrical outlets. Additionally, the one or more electrical outlets may have one or more universal serial bus (USB) connection ports which may be configured and adapted to provide power for an electrical device. In other modifications, one or more other features of the concealed shelf described above with reference to FIGS. 1-6, including the tray comprising one or more extension segments that are telescopic relative to one another (FIG. 4) or that are hingedly attached to one another (FIG. 4), may be incorporated into shelf system 100 of the present embodiment without departing from the spirit and scope of the present disclosure.

Shelf component 102 and support frame component 104 of shelf system 100 described herein may be manufactured of suitable rigid non-yielding materials. For example, these components made be made of a suitable plastic material, such as polyurethane plastic or acrylonitrile butadiene styrene (ABS) plastic. Alternatively, these components may be made of wood or an extruded rigid metal, such as aluminum.

During assembly of shelf system 100, support frame component 104 is first securely mounted to a fixed structure. For example, support frame component 104 is secured to fixed structure S, as shown in FIG. 14, using suitable fasteners, such as screws, which are passed through mounting holes 140 and anchored in fixed structure S. In the embodiment shown in FIG. 14, the two mounting holes 140 provided near top end 126 of panel 125 are used to securely mount support frame component 104 to fixed structure S. Alternatively, support frame component 104 can be secured to fixed structure S using a suitably adhesive material, adhesive tape and/or Velcro connectors applied between rear side 129 of support frame component 104 and a surface of fixed structure S.

After support frame component 104 is securely mounted to the fixed structure as set forth above, shelf component 102 is positioned relative to support frame component 104 as shown in FIG. 9, for example, and moved towards support frame component 104 until rear end 112 of shelf component 102 is received in recess 144 of support frame component and the portion of cross member 134, including surface 150, is received by notch 120 of shelf component 102, shown in FIGS. 7, 8, 14 and 18. By this positional and structural arrangement, first metal strip 122 provided in notch 120 is magnetically engaged with magnetic elements 146 on surface 150 of cross member 134, and second metal strip 124 provided on top 106 at rear end 112 of shelf component 102 is magnetically engaged with magnetic elements 148 mounted to side surface 152 and inner surface 154 (within recess 144) of overturned portion 142 of panel 125. Stabilizing element 160 is then adjusted as described above to stabilize shelf system 100 relative to fixed surface S. In this configuration, shelf component 102 is securely supported by support frame component 104 in a cantilevered fashion, as shown in FIGS. 7, 8, 14 and 18

According to the present disclosure, the magnetic engagement between second metal strip 124 of shelf component 102 and magnetic elements 148 of support frame component 104 stabilizes shelf component 102 by preventing upon and down movement of shelf component 102 relative to support frame component 104. The magnetic engagement between first metal strip 122 of shelf component 102 and magnetic elements 146 of support frame component 104, along with the portion of cross member 134, including surface 150, being received by notch 120 of shelf component 102, also prevents up and down movement of shelf component 102 relative to support frame component 104 as well as prevents front and rear movement of shelf component 102 relative to support frame component 104. Accordingly, the magnetic engagement between the metal strips and magnetic elements as well as the stabilizing effect of stabilizing element 160 in the assembled state of shelf system 100, as described above, insures that shelf system 100 remains completely stable and fully functional during use.

In the embodiment of the present disclosure described above with reference to FIGS. 7-19, the metal strips are provided on shelf component 102 and the magnetic elements are provided on support frame component 104. In an alternative embodiment, this configuration may be reversed by providing the metal strips on support frame component 104 and the magnetic elements on shelf component 102.

Figure 19:
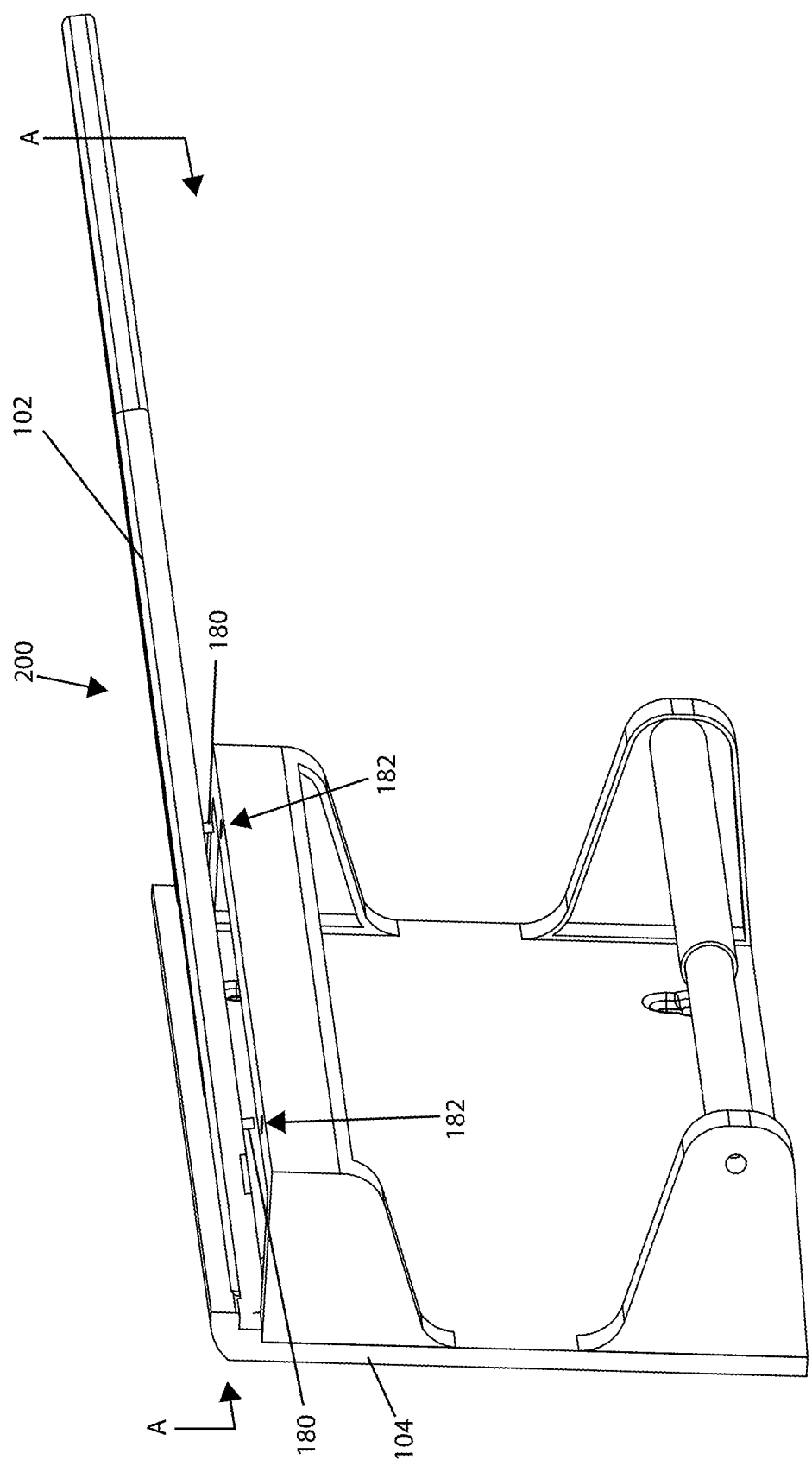
FIG. 19 is a perspective view of a shelf system, including a shelf component and a support frame component, according to another embodiment of the present disclosure.
Figure 21:
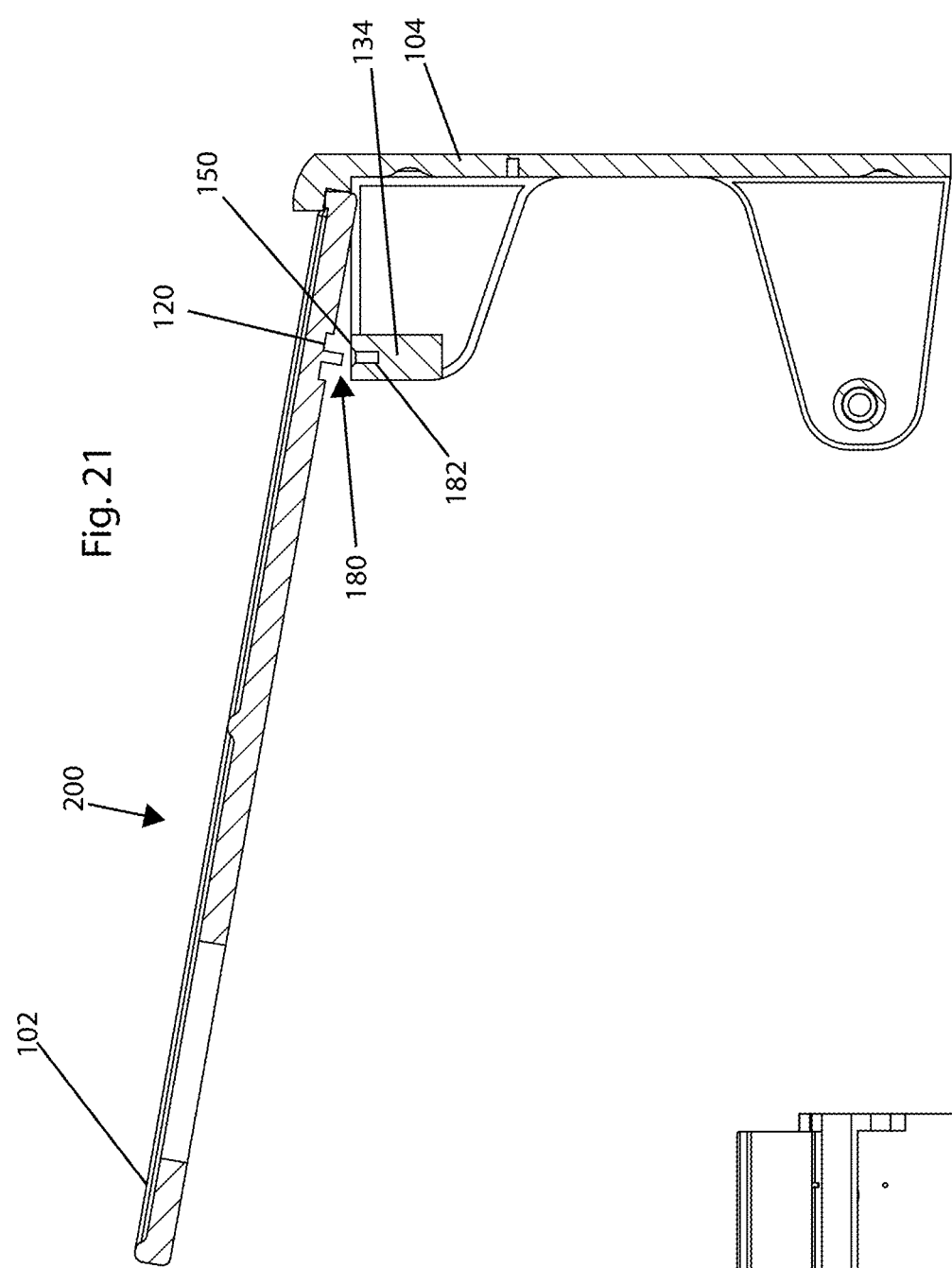
FIG. 21 is a cross sectional view of the shelf system taken along the line A-A in FIG. 20.
Figure 20:
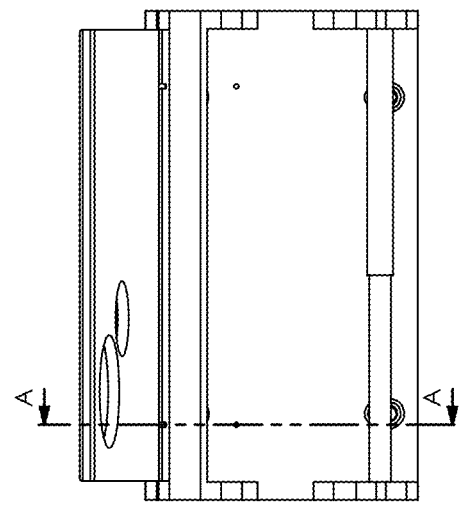
FIG. 20 is a front view of the shelf system of FIG. 19.

FIGS. 19-21 show another embodiment of a shelf system, generally designated at 200, according to the present disclosure. FIGS. 19 and 20 are a perspective view and a front view, respectively, of shelf system 200, and FIG. 21 is a cross-sectional view taken along cross-sectional line A-A in FIG. 20. Shelf system 200 incorporates all of the structural features and advantages as described above for the shelf system 100 described above with reference to FIGS. 7-18, with like numerals representing like elements, except for the differences described below.

Shelf system 200 differs from shelf system 100 in that shelf component 102 is securely mounted to support frame component 104 using pins 180 and holes 182 instead of the magnetic engagement between first metal strip 122 and magnetic elements 146. In the embodiment shown in FIGS.

19-21, pins 180 extend from notch 120 of shelf component 102 and holes 182 are formed in surface 150 of cross member 134 of support frame component 104. In the assembled state of shelf system 200, holes 182 securely receive respective pins 180. Alternatively, notch 120 of shelf component 102 may be provided with holes 182 and cross member 134 of support frame component 104 may be provided with pins 180 for engagement with holes 182 without departing from the spirit of the present disclosure. In this embodiment, the magnetic connection between second metal strip 124 of shelf component 102 and magnetic element 148 of support frame component 104 is the same as described above for shelf system 100. It will be appreciated that pins 180 and holes 182 define means for releasably securing cross member 134 of support frame component 104 in notch 120 of shelf component 102 in the assembled state of shelf system 200.

FIG. 22 shows another embodiment of a shelf system, generally designated at 300, according to the present disclosure. Shelf system 300 incorporates all of the structural features and advantages as described above for the shelf system 100 described above with reference to FIGS. 7-18, with like numerals representing like elements, except for the differences described below.

Shelf system 300 differs from shelf system 100 in that mounting holes 140 (e.g., FIG. 9) for releasably securing support frame component 104 to the surface of a fixed structure are replaced with double sided tapes 190. Each of the opposite main surfaces of each double sided tape 190 contains an adhesive film which is covered with a release film. Double sided tapes of this kind are commercially available under the name SCOTCH® Extreme Mounting Tape.

Each double sided tape 190 is applied to support frame component 104 by first peeling off the release film from one of the main surfaces to expose the adhesive layer to expose the adhesive film and pressing, for a preselected period of time, the main surface of double sided tape 190 with the adhesive film firmly against rear side 129 of support frame component 104. Support frame component 104, now applied with double sided tapes 190 as shown in FIG. 22, is applied to the surface of a fixed structure by first peeling off the release film from the other of the main surfaces of each double sided tape 190 to expose the adhesive film and then pressing, for a preselected period of time, support frame component 104 with the adhesive films firmly against the surface of the fixed structure. In this state, support frame component 104 is firmly anchored and can support shelf component 102 in assembled and disassembled states as described above for the shelf system 100.

In the embodiment of FIG. 22, double sided tapes 190 comprise two generally vertical strips of double sided tape extending in spaced-apart relation along lateral sides 130 of support frame component 104 in parallel relation thereto. It will be appreciated, however, that double sided tapes having configurations different from double sided tapes 190 and applied to rear side 129 with orientations different from the orientations shown in FIG. 22 may be adopted without departing from the spirit and scope of the invention. It will also be appreciated that either a single double sided tape or more than two double sided tapes may be used to mount support frame component to the surface of the structure without departing from the spirit and scope of the invention.

The benefits of using double sided tape to mount support frame component 104 to the surface of the structure is that the double sided tape can be easily applied and removed and obviates the need for drilling holes into the structure and utilizing screws or similar fasteners to mount support frame component 104. The double sided tape selected according to the present disclosure is preferably water resistant and adapted for use on different types of surfaces.

In an alternative embodiment, double sided tapes 190 may be replaced with one or more Velcro connectors, such as of the kind commercially available under the name VELCRO® Brand Extreme Outdoor. One of the opposite surfaces of this type of Velcro connector is provided with an adhesive film and the other opposite surface is provided with hooks or loops. In use, first Velcro connectors with one of hooks or loops are firmly adhered to rear side 129 of support frame component 104, and second Velcro connectors with the other of hooks or loops are firmly adhered to the surface of a fixed structure for engagement with the corresponding hooks/loops of the first Velcro connectors to securely mount support frame component 104 to the structure.

It will be appreciated that the double sided tapes and Velcro connectors described above can also be used to securely mount to a surface of a structure each of the housings 1 described above with reference to FIGS. 1-6 and each of the support frame components 104 described above with reference to FIGS. 7-21 and described below with reference to FIGS. 23-24.

Figure 23:
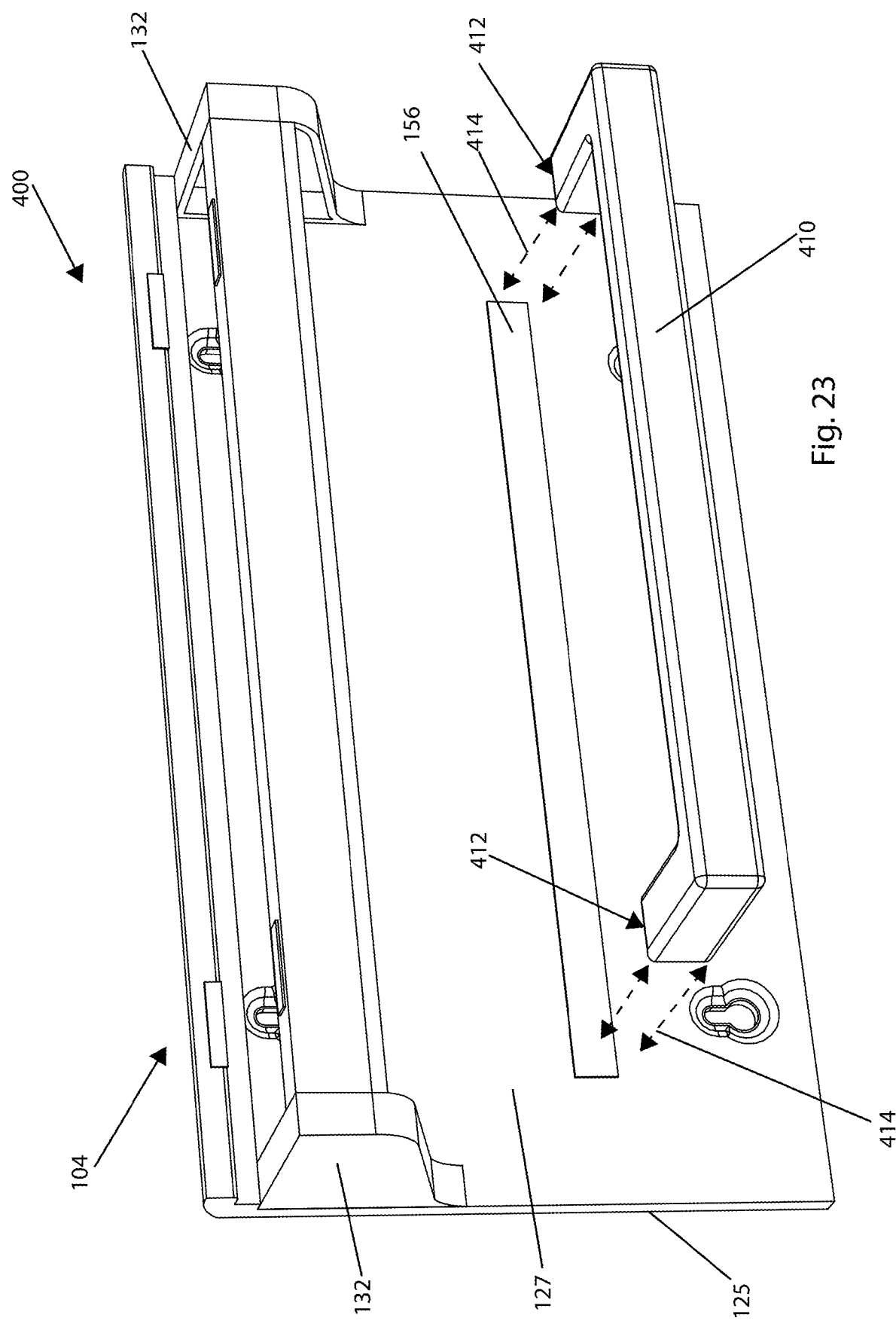
FIG. 23 is a perspective view of a shelf system according to another embodiment of the present disclosure.

FIG. 23 shows another embodiment of a shelf system, generally designated at 400, according to the present disclosure. Shelf system 400 incorporates all of the structural features and advantages as described above for the shelf system 100 described above with reference to FIGS. 7-18, with like numerals representing like elements, except for the differences described below.

Shelf system 400 differs from shelf system 100 in that shelf system 400 is not provided with second pair of support members 136. In the assembled state of shelf system 400 (e.g., similar to shelf system 100 in FIG. 8, except that second pair of support members 136 and rod 138 are not provided in shelf system 400), magnetic element 156 provided on front side 127 of panel 125 is configured to removably magnetically support a holder 410 for holding towels and the like, as denoted by double-headed arrows 414. To accomplish this, holder 410 can be made of a suitable metallic material that magnetically connects to magnetic element 156. Alternatively, suitable magnetic elements are provided on end surfaces 412 of holder 410 for magnetic connection to magnetic element 156. The magnetic force between magnetic element 156 and holder 410 is selected so that it is sufficient to securely retain holder 410 in place during use while allowing holder 410 to be readily disconnected from magnetic element 156 during non-use (e.g., in a disassembled state of the shelf system).

Other than holder 410, magnetic element 156 is also configured to magnetically support various metallic items, such as cosmetic utensils, appliances and/or electronics. It will be appreciated that the various holders and items described above, as well as other similar items, can be readily attached and detached from magnetic element 156, and thus removably attached to and detached from front side 127 of panel 125, thereby resulting in a highly versatile shelf system.

Figure 24:
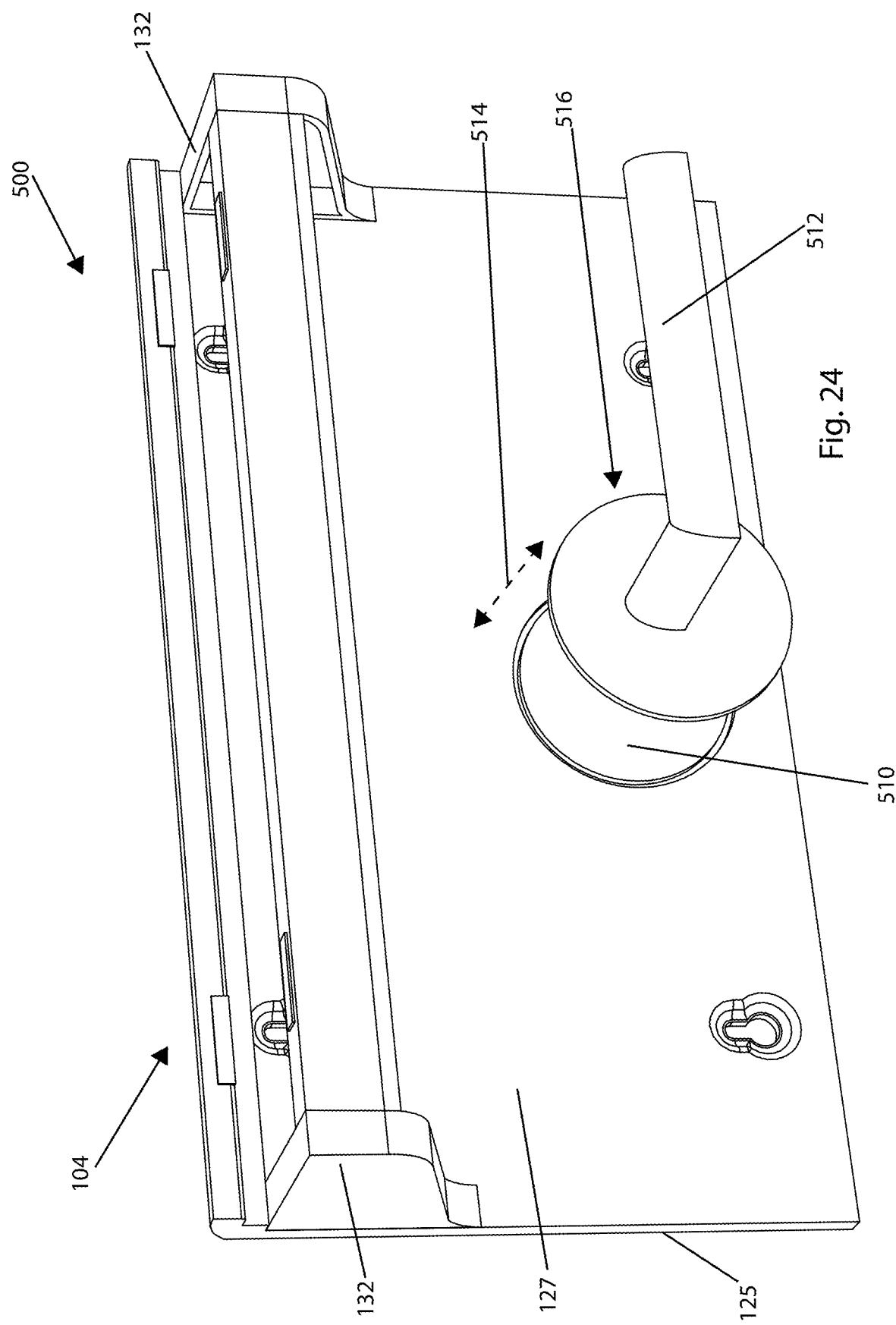
FIG. 24 is a perspective view of a shelf system according to another embodiment of the present disclosure.

FIG. 24 shows another embodiment of a shelf system, generally designated at 500, according to the present disclosure. Shelf system 500 is similar to shelf system 400 described above with reference to FIG. 23, except that a magnetic element 510 is provided on front side 127 of panel 125 instead of magnetic element 156. In this embodiment, magnetic element 510 is generally circular in shape and is configured to magnetically support a holder 512 for a roll of paper, such as a roll of toilet paper, as denoted by double-headed arrow 514.

To accomplish this, holder 512 can be made of a suitable metallic material that magnetically connects to magnetic element 510. Alternatively, a suitable magnetic element is provided on end surface 516 of holder 512 for magnetic connection to magnetic element 510.

Magnetic element 510 is securely mounted on front side 127 of panel 125 using various techniques. For example, magnetic element 510 can be mounted using suitable fasteners or adhesives, as described above for magnetic element 156. Magnetic element 510 is preferably partially embedded into the surface of panel 125 provided that it is exposed from front side 127, as shown in FIG. 24, so as to be able to support holder 512 with sufficient magnetic force to securely retain it in place during use. As such, the magnetic force between magnetic element 510 and holder 512 is selected so that it is sufficient to securely retain holder 512 in place during use while allowing holder 512 to be readily disconnected from magnetic element 510 during non-use (e.g., in a disassembled state of the shelf system). Magnetic element 510 is also configured to magnetically support items other than holder 512, such as cosmetic utensils, appliances and/or electronics, as described above for shelf system 400.

It will be appreciated that the features of the magnetic elements and corresponding holders/items supported by such magnetic elements described above with reference to FIGS. 23 and 24 can also be incorporated in any of the shelf systems described above with reference to FIGS. 1-6.

It will be appreciated that the shelf systems described above with reference to FIGS. 7-24 can be fabricated with varying dimensions, shapes and using various types of materials so as to achieve a compact and portable design suitable for being easily transported and assembled for use. For example, in one particular embodiment of the shelf system suitable for use in small areas, such as bathrooms, for example, support frame component has a length (between opposite sides) of about 13 inches and a height of about 12 inches, and shelf component 102 has a length of about 12 inches and a width of about 12 inches. It will be understood that these dimensions can be made smaller or greater depending on the materials selected and the particular application for the shelf system.

The shelf systems described above with reference to FIGS. 7-24 can be also easily assembled for use and disassembled (collapsed) during periods of non-use (e.g., shelf component 102 is stored relative to support frame component 104 as described above).

It will be appreciated that each of the shelf systems described above with reference to FIGS. 1-24 has an enduring ergonomic aesthetic appeal by virtue of its construction and multiple arrangements (e.g., assembled and disassembled/storing states), can be transported and stored in a compact form, and is both cost efficient space saving.

Each of the shelf systems according to the present invention disclosed herein is compact because it is small in comparison to other wall shelves of counter tops and in addition it does not obstruct passage or view. Also, the tray can be placed in the stored state by being stowed inside the housing (e.g., FIGS. 1-6) or attached to the front side of the housing (e.g., FIGS. 7-22) and not take up additional space. Additionally, in the embodiments described above with reference to FIGS. 23 and 24, the magnetic holders for holding towels or rolls of paper (e.g., toilet paper) can be readily detached from the housing of the shelf system, making it easier to disassemble and pack the shelf system for storage and/or transportation. The shelf systems according to the present invention are handy, light weight and can be made in small sizes which makes it easy to move or pack when traveling. The relatively small size and weight as well as the simplicity with which it can be attached and removed from a structural surface and placed between the assembled and disassembled states, including positioning the tray between the stored and non-stored states, are features that make the shelf systems according to the present invention compact. The benefits of the compact shelf systems according to the present invention are that they offer more counter space while taking up less space in doing so. This makes it very efficient to solve space deficiency.

The shelf systems according to the present invention are modular because they have a simple connecting design. The interchangeable trays or holders for towels or toilet paper connect and disconnect easily. There are no moving mechanical parts, thus reducing costs and time to assemble. These shelf systems are also modular because no special tools are needed to assemble the shelf system, and the various parts connect easily, such as the tray and toilet/tower holder to the housing. Different shapes and sizes of trays and holders can be easily attached and detached as well. The benefits are flexible arrangement with trays and holders for paper or towels, depending on the environment where it is going to be used, in addition to being easy to assemble, disassemble, reassemble.

The shelf systems according to the present invention are portable because they can be releasably secured with fasteners such as tape, bolts and or screws onto many surfaces both indoors and outdoors. These shelf systems can be attached to moving or non-moving objects or motorized machines and be secured easily. The magnets or pins/holes and how it catches or locks on the notch and rear of the shelf, as describes above, stabilizes the tray while its surroundings are in movement. These shelf systems can be detached in minutes and moved to another location. With the GFCI electrical outlets and USB ports as described above, the shelf systems are suitable for both indoor and outdoor use. The benefits of being portable are that it travels trouble-free and can be used in many locations due to its flexibility.

As described above, stabilizing element 160 (FIGS. 9, 14, 18) functions as a spacer that helps keep the housing or panel aligned or flush parallel to surfaces that might have an overlapping lip such a bathroom vanity, work table, desk, or kitchen sink. What makes it a spacer is the threaded element (e.g., adjustable screw) attached to the rear of the shelf system which can be adjusted to the desired distance. Benefits of this configuration are that it helps with leveling the housing and tray both vertically and horizontally when in use so as to allow objects to be placed on and be retained on the tray. Additionally, the spacer keeps the shelf system from moving as it braces the shelf system and keeps it steady when it wedges the shelf system and the surface to which the shelf system is mounted.

The shelf systems according to the present invention are collapsible in that they can be disassembled in seconds, including retraction of the trays. When a double sided tape or Velcro connectors are used to mount these shelf systems to the surface of a structure as described above, these shelf systems can be quickly and easily removed from one structure and mounted to another structure. What also makes it particularly collapsible is that the trays can be easily stored relative to the housing as described above with reference to embodiments of FIGS. 1-24. In this regard, the tray can be readily disconnected from the housing and be stored away, thus reducing possible damage to the shelf system. Other benefits of the collapsible feature of the shelf systems according to the present invention are that they take up less space when collapsed or concealed and are easy to store and transport.

The shelf systems according to the present invention are also free-floating because they can be readily mounted on the surface of the structure using fasteners such as bolts, tape and/or Velcro connectors as described above. In this way, when mounted to the surface of the structure these shelf systems exhibit a clean aesthetic appearance in that it is not bulky or heavy looking (e.g., with many movable parts or hinges attaching them to the structure), particularly because the fasteners are substantially concealed from view. As such, when mounted on surfaces of structures as describes above, these free-floating feature creates the appearance that the shelf systems are floating or hanging in the air. This is in addition to the benefits that they take up little space, exhibit a clean (uncluttered) look, and can be used in any place whether stationary or moving.

The disclosure has been described herein using specific embodiments for the purposes of illustration only. It will be readily apparent to one of ordinary skill in the art, however, that the principles of the disclosure can be embodied in other ways. Therefore, the disclosure should not be regarded as being limited in scope to the specific embodiments disclosed herein, but instead as being fully commensurate in scope with the following claims.

I claim:

1. A shelf system comprising:
   a shelf component having a top surface, a bottom surface, a front end, a rear end, opposite sides extending between the front and rear ends, and a longitudinal groove formed in the bottom surface between the opposite sides;
   a support frame component configured to removably support the shelf component in a cantilever fashion in an assembled state of the shelf system, the support frame component including a base panel having a front side, a rear side, a top end, a bottom end, opposite lateral sides between the top and bottom ends, a pair of support members extending from the front side of the base panel proximate the respective lateral sides, and a cross member supported by the pair of support members; and
   means for releasably securing the shelf component to the support frame component in the assembled state of the shelf system;
   wherein the means for releasably securing comprises a first metal strip mounted in the groove of the shelf component, a second metal strip mounted on the top surface of the shelf component proximate the front end thereof, a first magnetic element disposed on the cross member for magnetic engagement with the first metal strip in the assembled state of shelf system, and a second magnetic element disposed at the top end of the base panel for magnetic engagement with the second metal strip in the assembled state of shelf system.

2. The shelf system according to claim 1, further comprising a third magnetic element disposed on the front side of the base panel for magnetic engagement with the first metal strip in a stored state of the shelf system in which the shelf system is not in the assembled state.

3. The shelf system according to claim 1, wherein the shelf component and the support frame component are made of one of a polyurethane plastic or acrylonitrile butadiene styrene (ABS) plastic.

4. The shelf system according to claim 1, wherein the base panel of the support frame component has a preselected number of mounting holes configured to receive respective fasteners for releasably securing the support frame component to a surface of a structure.

5. The shelf system according to claim 4, further comprising an adjustable stabilizing element mounted to the rear side of the base panel for adjustably stabilizing the shelf system while the support frame component is releasably mounted to the structure.

6. The shelf system according to claim 1, further comprising at least one double sided tape for releasably securing the support frame component to a surface of a structure.

7. The shelf system according to claim 1, further comprising at least one Velcro connector mounted to the rear side of the support frame component for releasable engagement with a Velcro connector mounted on a surface of a structure for releasably securing the support frame component to the surface of the structure.

8. The shelf system according to claim 1, wherein the pair of support members comprises a first pair of support members; and further comprising a second pair of support members extending from the front side of the base panel and a holder removably supported by the second pair of support members for releasably holding at least one of a roll of paper, a towel and/or a cloth for readily accessible use in the assembled state of the shelf system.

9. The shelf system according to claim 8, wherein the first and second pairs of support members extend a preselected distance from the front side of the support frame component to define between the cross member and the holder a space configured to receive the shelf component in a disassembled state of the shelf system in which the shelf component is not supported in a cantilever fashion by the support frame component.

10. The shelf system according to claim 1, further comprising a magnetic element disposed on the front side of the base panel and configured for releasably magnetically supporting in the assembled state of the shelf system an item including a holder for a roll of paper or a towel, cosmetic utensils, appliances, hardware and/or electronics.

11. The shelf system according to claim 1, further comprising a spacer extending from the rear side of the base panel for engagement with a surface of a structure for maintaining the base panel in spaced-apart relation to the surface of the structure in the assembled state of the shelf system.

12. A shelf system comprising:
   a shelf component having a top surface, a bottom surface, a front end, a rear end, opposite sides extending between the front and rear ends, and a longitudinal groove formed in the bottom surface between the opposite sides;
   a support frame component configured to removably support the shelf component in a cantilever fashion in an assembled state of the shelf system, the support frame component including a base panel having a front side, a rear side, a top end, a bottom end, opposite lateral sides between the top and bottom ends, a pair of support members extending from the front side of the base panel proximate the respective lateral sides, and a cross member supported by the pair of support members; and
   means for releasably securing the shelf component to the support frame component in the assembled state of the shelf system;

wherein the means for releasably securing comprises a plurality of pins extending from the groove of the shelf component, a plurality of holes formed in the cross member for releasably receiving the respective pins, a metal strip mounted on the top surface of the shelf component proximate the front end thereof, and a magnetic element disposed at the top end of the base panel for magnetic engagement with the metal strip.

13. A shelf system comprising:
a shelf component having a top surface, a bottom surface, a front end, a rear end, opposite sides extending between the front and rear ends, and a longitudinal groove formed in the bottom surface between the opposite sides;
a support frame component configured to removably support the shelf component in a cantilever fashion in an assembled state of the shelf system, the support frame component including a base panel having a front side, a rear side, a top end, a bottom end, opposite lateral sides between the top and bottom ends, a pair of support members extending from the front side of the base panel proximate the respective lateral sides, and a cross member supported by the pair of support members; and
means for releasably securing the shelf component to the support frame component in the assembled state of the shelf system;
wherein the means for releasably securing comprises a plurality of pins extending from the cross member of the support frame components, a plurality of holes formed in the groove of the shelf component for releasably receiving the respective pins, a metal strip mounted on the top surface of the shelf component proximate the front end thereof, and a magnetic element disposed at the top end of the base panel for magnetic engagement with the metal strip.

14. The A shelf system comprising:
a shelf component having a top surface, a bottom surface, a front end, a rear end, opposite sides extending between the front and rear ends, and a longitudinal groove formed in the bottom surface between the opposite sides;
a support frame component configured to removably support the shelf component in a cantilever fashion in an assembled state of the shelf system, the support frame component including a base panel having a front side, a rear side, a top end, a bottom end, opposite lateral sides between the top and bottom ends, a pair of support members extending from the front side of the base panel proximate the respective lateral sides, and a cross member supported by the pair of support members; and
means for releasably securing the shelf component to the support frame component in the assembled state of the shelf system;
wherein the base panel of the support frame component has a preselected number of mounting holes configured to receive respective fasteners for releasably securing the support frame component to a surface of a structure; and
wherein the means for releasably securing comprises a first metal strip mounted in the groove of the shelf component, a second metal strip mounted on the top surface of the shelf component proximate the front end thereof, a first magnetic element disposed on the cross member for magnetic engagement with the first metal strip in the assembled state of shelf system, and a second magnetic element disposed at the top end of the base panel for magnetic engagement with the second metal strip in the assembled state of shelf system; further comprising a third magnetic element disposed on the front side of the base panel for magnetic engagement with the first metal strip in a stored state of the shelf system in which the shelf system is not in the assembled state; wherein the base panel of the support frame component has a preselected number of mounting holes configured to receive respective fasteners for releasably mounting the support frame component to a surface of a structure; and wherein the shelf system is configured for selective placement between the assembled state and the stored state while the support frame component is releasably mounted to the structure.

15. The shelf system according to claim 14, further comprising an adjustable stabilizing element mounted to the rear side of the base panel for adjustably stabilizing the shelf system in the assembled and stored states thereof while the support frame component is releasably mounted to the structure.

16. A portable, compact shelf system comprising:
a support frame component configured to be releasably secured to an exterior surface of a structure, the support frame component including a base panel having a front side, a rear side, a top end, a bottom end, opposite lateral sides between the top and bottom ends, a pair of support members extending from the front side of the base panel proximate the respective lateral sides, and a cross member supported by the pair of support members;
means for releasably securing the support frame component to the exterior surface of the structure; and
a shelf component configured, in an assembled state of the shelf system, to be releasably secured in a cantilever fashion to the support frame component and configured, in a disassembled state of the shelf system, to be stored relative to the support frame component, the shelf component having a top surface, a bottom surface, a front end, a rear end, opposite sides extending between the front and rear ends, and a longitudinal groove formed in the bottom surface between the opposite sides;
a first metal strip mounted in the groove of the shelf component;
a second metal strip mounted on the top surface of the shelf component proximate the front end thereto;
a first magnetic element disposed on the cross member for magnetic engagement with the first metal strip in the assembled state of shelf system; and
a second magnetic element disposed at the top end of the base panel for magnetic engagement with the second metal strip in the assembled state of shelf system.

17. The portable, compact shelf system according to claim 16, further comprising a third magnetic element disposed on the front side of the base panel for magnetic engagement with the first metal strip in a stored state of the shelf system in which the shelf system is not in the assembled state, and for releasably magnetically supporting in the assembled state of the shelf system an item including a holder for a roll of paper or a towel, cosmetic utensils, appliances, hardware and/or electronics.

18. The portable, compact shelf system according to claim 16, wherein the shelf component and the support frame component are made of one of a polyurethane plastic or acrylonitrile butadiene styrene (ABS) plastic.

19. The portable, compact shelf system according to claim 16, wherein the means for releasably securing the support frame component to the exterior surface of the structure comprises at least one double sided tape provided on the rear side of the support frame component.

20. The portable, compact shelf system according to claim 16, further comprising a spacer extending from the rear side of the base panel for engagement with
the exterior surface of the structure for maintaining the base panel in spaced-apart relation to the exterior surface of the structure in the assembled state of the shelf system.

21. A portable, compact shelf system
a support frame component configured to be releasably secured to an exterior surface of a structure, the support frame component including a base panel having a front side, a rear side, a top end, a bottom end, opposite lateral sides between the top and bottom ends, a pair of support members extending from the front side of the base panel proximate the respective lateral sides, and a cross member supported by the pair of support members;
means for releasably securing the support frame component to the exterior surface of the structure; and
a shelf component configured, in an assembled state of the shelf system, to be releasably secured in a cantilever fashion to the support frame component and configured, in a disassembled state of the shelf system, to be stored relative to the support frame component, the shelf component having a top surface, a bottom surface, a front end, a rear end, opposite sides extending between the front and rear ends, and a longitudinal groove formed in the bottom surface between the opposite sides;
a plurality of pins extending from the groove of the shelf component;
a plurality of holes formed in the cross member for releasably receiving the respective pins in the assembled state of the shelf system;
a metal strip mounted on the top surface of the shelf component proximate the front end thereof; and
a magnetic element disposed at the top end of the base panel for magnetic engagement with the metal strip in the assembled state of the shelf system.

* * * * *